United States Patent [19]
Shintani et al.

[11] Patent Number: 5,922,068
[45] Date of Patent: *Jul. 13, 1999

[54] INFORMATION PROCESSING SYSTEM AND INFORMATION PROCESSING METHOD FOR EXECUTING INSTRUCTIONS IN PARALLEL

[75] Inventors: Yooichi Shintani, Hadano; Kazunori Kuriyama, Saitama-ken; Tohru Shonai; Eiki Kamada, both of Hadano; Kiyoshi Inoue, Tokyo, all of Japan

[73] Assignee: Hitachi Ltd., Tokyo, Japan

[*] Notice: This patent is subject to a terminal disclaimer.

[21] Appl. No.: 08/888,645

[22] Filed: Jul. 7, 1997

Related U.S. Application Data

[63] Continuation of application No. 07/915,204, Apr. 20, 1992., Pat. No. 5,671,382, which is a continuation of application No. 07/550,566, Jul. 10, 1990., abandoned, which is a continuation of application No. 07/123,139, Nov. 20, 1987., Pat. No. 4,942,525

[30] Foreign Application Priority Data

Nov. 21, 1986 [JP] Japan .................................. 61-276554

[51] Int. Cl.$^6$ ...................................................... G06F 9/38
[52] U.S. Cl. ........................................ 712/215; 712/212
[58] Field of Search .................................... 395/391, 392, 395/582, 800.21, 800.01; 712/212, 215, 216, 1, 21; 713/401

[56] References Cited

U.S. PATENT DOCUMENTS

| | | | |
|---|---|---|---|
| 4,507,728 | 3/1985 | Sakamoto et al. ................. | 395/800.01 |
| 4,594,655 | 6/1986 | Hao et al. ................................ | 394/394 |
| 4,626,989 | 12/1986 | Torii ......................................... | 395/393 |
| 4,766,566 | 8/1988 | Chuang ............................... | 395/800.23 |
| 4,783,783 | 11/1988 | Nagai et al. ........................ | 395/182.15 |
| 4,833,599 | 5/1989 | Calwell et al. .......................... | 395/583 |
| 4,837,676 | 6/1989 | Rosman ............................. | 395/800.21 |
| 4,858,105 | 8/1989 | Kuriyama et al. ...................... | 395/582 |
| 4,903,196 | 2/1990 | Pomerene et al. ...................... | 395/393 |
| 4,942,525 | 7/1990 | Shintani et al. ........................ | 395/393 |
| 4,943,915 | 7/1990 | Wilhelm et al. ................... | 395/800.34 |
| 5,133,077 | 7/1992 | Karne et al. ....................... | 395/800.23 |

FOREIGN PATENT DOCUMENTS 58-176751  10/1983  Japan .

*Primary Examiner*—Gopal C. Ray
*Attorney, Agent, or Firm*—Kenyon & Kenyon

[57] ABSTRACT

An information processing apparatus in which instructions are processed one by one conceptually and results thereof are conceptually orderly written into a memory comprises an instruction control circuit capable of decoding M instructions and reading operands in parallel, N (N≧M) execution circuits capable of executing a plurality of instructions mutually in parallel, a detection circuit for determining whether all of M execution circuits of the N execution circuits required by the M instructions decoded by the instruction control circuit are vacant or not, and a reserve circuit for reserving the execution of the M decoded instruction while the detection fails to detect sufficient vacancy.

11 Claims, 13 Drawing Sheets

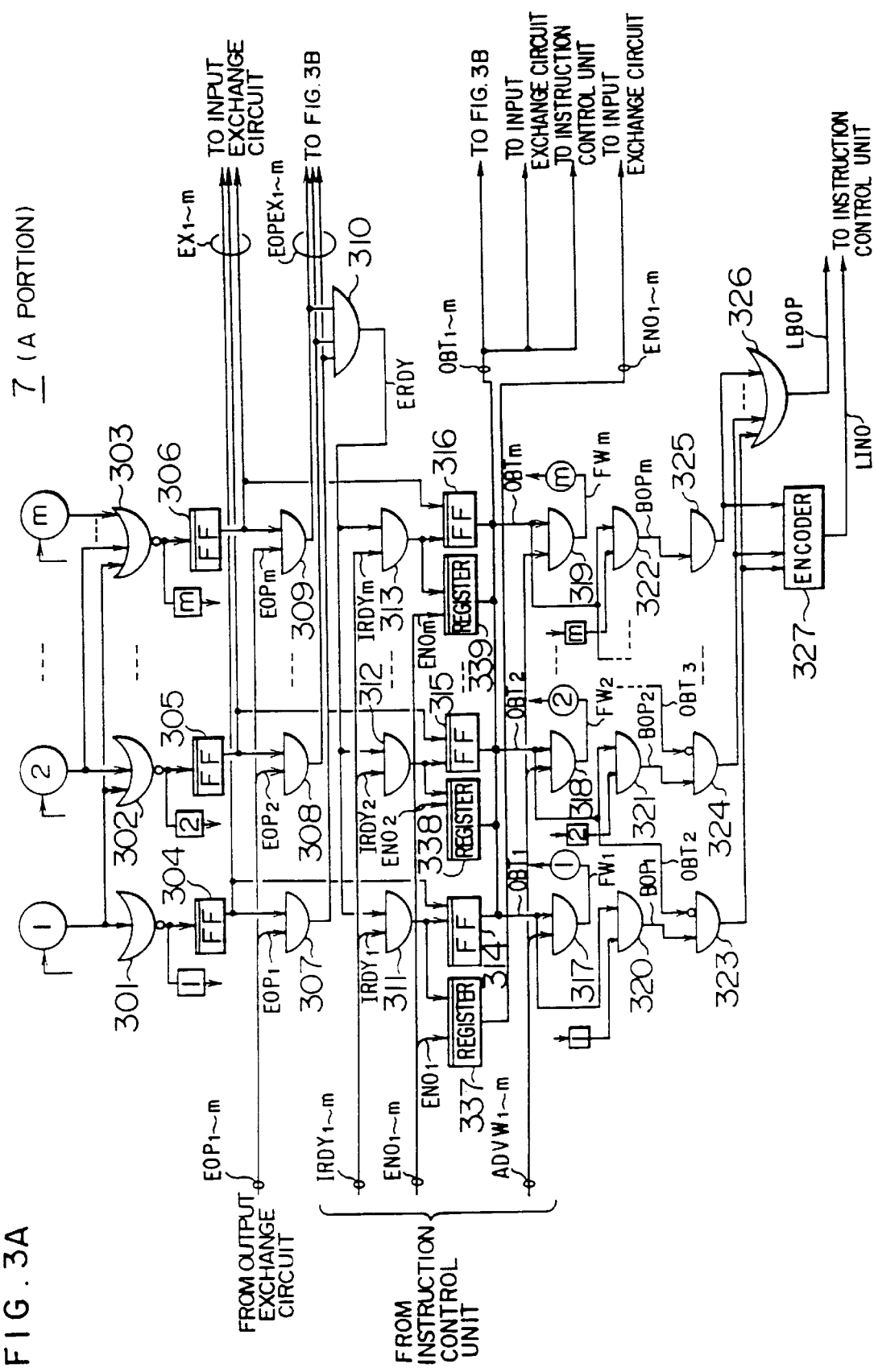
FIG. 3A　7 (A PORTION)

(1) INSTRUCTION FOR MAT 1

(2) INSTRUCTION FOR MAT 2

INFORMATION PROCESSING SYSTEM AND INFORMATION PROCESSING METHOD FOR EXECUTING INSTRUCTIONS IN PARALLEL

This application is a continuation of U.S. patent application Ser. No. 07/915,204, filed Apr. 20, 1992 U.S. Pat. No. 5,671,382, which is a continuation of U.S. patent application Ser. No. 07/550,566, filed Jul. 10, 1990, now abandoned, which is a continuation of U.S. patent application Ser. No. 07/123,139, filed Nov. 20, 1987, which issued as U.S. Pat. No. 4,942,525 on Jul. 17, 1990.

BACKGROUND OF THE INVENTION

The present invention relates to an information processing unit such as a general purpose computer in which instructions are executed one by one conceptually as viewed from a program, and more particularly to a system important in parallel execution a plurality of instructions in a plurality of execution units to improve a processing speed.

Of computers in which instructions are executed one by one conceptually, those which are intended to improve the processing speed by parallel execution are shown in "An Efficient Algorithm for Exploiting Multiple Arithmetic Units" by R. M. Tomasulo, IBM Journal, 1967 January which relates to IBM 360/91, JP-A-58-176751 entitled "Instruction Decode Unit", U.S. Pat. No. 4,626,989 (or corresponding EU-A-101,596 or JP-A-59-32045) and EU-A-150,449 (or corresponding U.S. patent application Ser. No. 682,839 or JP-A-60-129838). In those computers, since a plurality of conceptually ordered instructions are executed in different execution units, results thereof may be written in a different order than the conceptual order. Thus, when an interruption occurs, it is generally difficult to determine up to which instruction has been executed with regard to the instruction causing the interruption. Where execution based on prediction is done until branch is determined by a branch instruction, if a result of prediction is miswritten when the prediction fails, a recovery thereof is necessary.

In an information processing apparatus in accordance with the IBM 370 architecture, the reversal of the write order as described above should not be observed from the program. Accordingly, in order to comply with the instruction execution order in the 370 architecture in an information processing apparatus which has a plurality of execution units and in which instructions may be simultaneously or disorderly executed, data and addresses thereof on fields of a memory which will be lost by the writing of the result are previously buffered before she execution of the instructions, and when the instruction execution overruns and it should be invalidated, the buffered data must be returned to the original fields. This method may be used for similar purpose as disclosed in JP-B-56-40382 entitled "Information Processing Apparatus" or its corresponding U.S. Pat. No. 4,385,365. However, this method is complex in control, needs buffer registers for data and addresses and hence is expensive, needs a time to recover data and hence an overall performance of the processing apparatus is lowered if the invalidation of instruction execution frequently occurs. When write overrun occurs to a main memory in the 370 architecture, data written by overrun from other processor or channel prior to recovery of the field may occur. In this case, the order rule of the architecture is not complied with even by the order assurance system by the buffer and recovery.

Such an overrun of the instruction execution occurs when an interrupt associated with the instruction execution occurs or when misprediction is detected during predicted execution of a succeeding instruction of a branch instruction.

SUMMARY OF THE INVENTION

It is an object of the present invention to provide an information processing apparatus which has a plurality of execution units and which can efficiently execute a plurality of instructions.

It is another object of the present invention to provide an information processing apparatus which can execute a plurality of instructions in parallel and can readily interrupt the execution of an instruction.

The above objects of the present invention are achieved by controlling the execution of instructions such that the passing of writing of a result does not take place between a plurality of simultaneously executed instructions. To this end, the following control means for the execution of instructions is used.

(1) Instruction set-up means for simultaneously setting up to the execution unit a plurality of instructions which are continuous from a standpoint of conceptual order of execution. A succeeding instruction to a branch instruction is considered to be continuous to the branch instruction whether the branch succeeds or not.

(2) Set-up instruction limit means for limiting a combination of instructions to be set-up in the execution unit such that succeeding instructions which execute writing prior to a final execution step in which a factor to invalidate an instruction in a plurality of instructions to be simultaneously set-up or succeeding instructions thereto may be detected, are not simultaneously set up.

(3) Succeeding instruction execution reserve means for controlling the execution of a plurality of instructions simultaneously set up, when a factor to reserve the execution occurs for one of the instructions, such that the execution of all succeeding instructions which possibly execute writing are reserved.

(4) Succeeding instruction execution suppress means for suppressing, before a write stage, the execution of all instructions to be invalidated, or of the instruction and all succeeding instructions thereof which are simultaneously executed, when a factor to invalidate the instruction or succeeding instructions thereof is detected in the execution of one of instructions simultaneously set up.

By the provision of the means (1)–(4), when there is no factor to invalidate the instruction or succeeding instruction thereof in the plurality of instructions simultaneously executed, the executions thereof are at the same time. Accordingly, a processing time is considerably shortened. If an invalidation factor is detected in any instruction, write overrun does not take place, and a correct instruction or interrupt can be immediately started without the recovery process described above.

BRIEF DESCRIPTION OF THE DRAWINGS

FIG. 3A shows a detailed diagram of a portion of an operation control unit 7 of FIG. 1.

DESCRIPTION OF THE PREFERRED EMBODIMENTS

An embodiment of the present invention is now explained. A computer in accordance with an architecture of Hitachi M-Series is specifically described.

Figure 9:
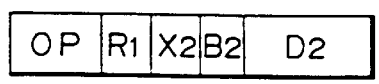
FIG. 9 shows an instruction format used in the apparatus of FIG. 1, FIGS. 10A and 10B show time charts of various signals in a simple instruction sequence.
Figure 9:
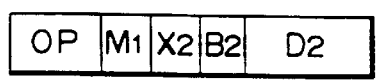

Examples of instruction format in the above architecture are shown in FIG. 9. (1) shows an instruction format used for a load instruction, a store instruction and add/subtract/multiply/divide instruction. OP denotes an operation code which indicates a type of instruction. R1 indicates a general register number which stores a first operand. X2 and B2 indicate an index register number and a base register number used to generate a second operand address. The index register and base register specify a general register. D2 indicates an address displacement used to generate an address. The operand address is generated by adding the index register, base register and address displacement. An add instruction reads a main memory data at the second operand address, adds it to the first operand in the general register designated by R1, and stores the result into the general resister R1. (2) shows an instruction format used for a conditional branch instruction. OP denotes an operation code which indicates a type of instruction. M1 denotes a mask value which designates a condition code which meets a branch condition. X2, B2 and D2 designate a second operand address. When the branch condition is met, instruction execution is resumed from the instruction at the second operand address.

Figure 1:
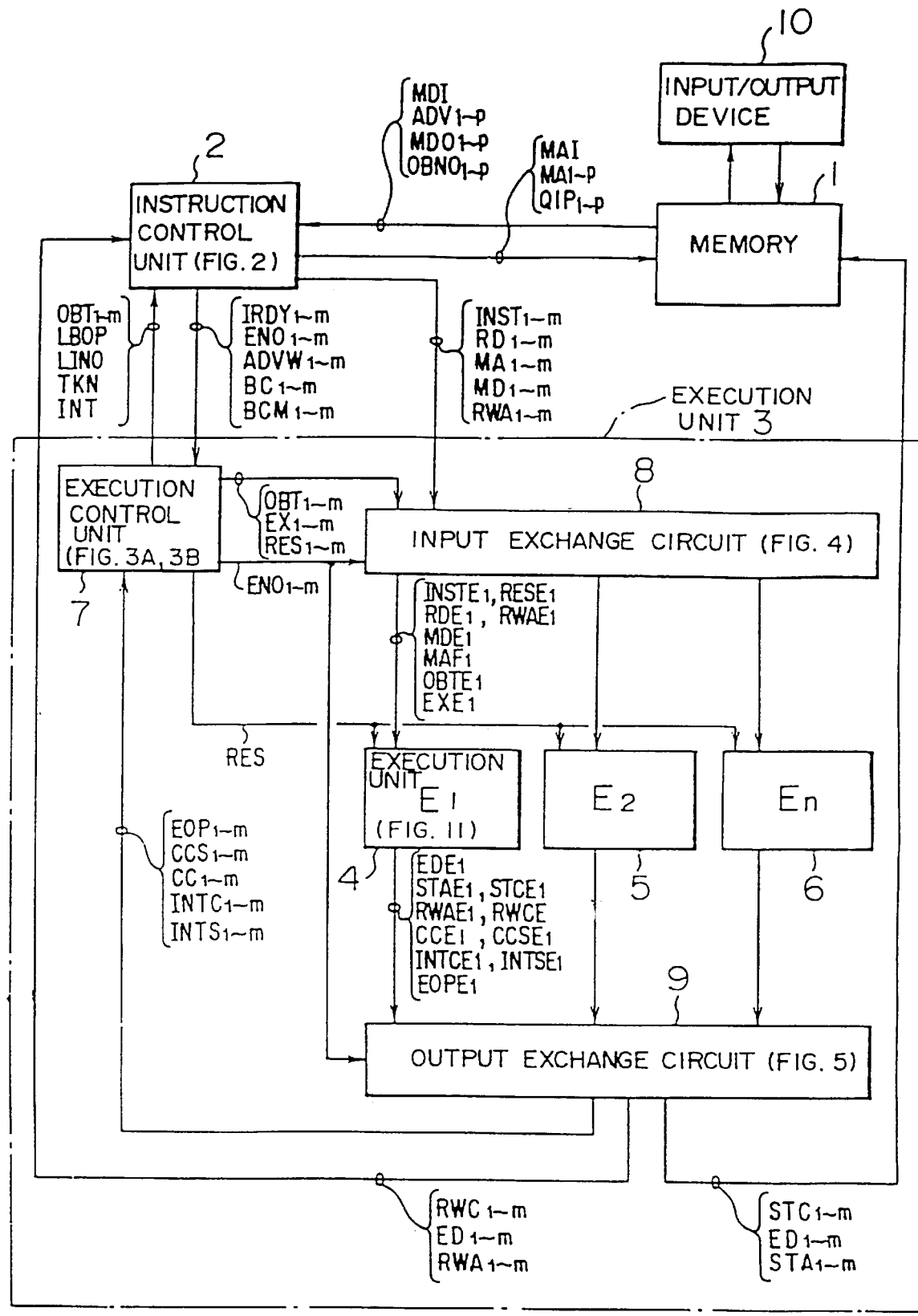
FIG. 1 shows an overall block diagram of a computer of the present invention.

FIG. 1 shows an overall configuration of a computer of the present invention. Numeral 1 denotes a memory, numeral 2 denotes an instruction control unit, numeral 3 denotes an execution unit, numerals 4, 5 and 6 denote n execution units E1, E2, . . . En, numeral 7 denotes an execution control unit, numeral 8 denotes an input exchange circuit, numeral 9 denotes an output exchange circuit and numeral 10 denotes an input/output device.

The memory 1 is a conventional one which stores data and programs and controls reading and writing thereof. The input/output device 10 is also a conventional one which requests writing of external data and reading of data to the memory 1. The instruction control unit 2 fetches a plurality of instructions from the memory 1, decodes a maximum of p instructions simultaneously, and simultaneously reads p operands necessary for those instructions. To this end, an instruction fetch address MAI is sent to the memory 1 from the instruction control unit 2 and an instruction sequence MDI is sent from the memory 1 to the instruction control unit 2. Up to p operand addresses $MA_i$ (i=1–p) are simultaneously sent from the instruction control unit 2 to the memory 1 and p fetched operand data $MDO_i$ (i=1–p) are sent from the memory 1 to the instruction control unit 2. As the operand addresses $MA_i$ (i=1–p) are sent, p input pointers $QIP_i$ (i=1–p) of the instruction queue 211 (FIG. 2) are sent from the instruction control unit 2 to the memory 1, and as the operand data $MDO_i$ (i=1–p) are sent, advance signals $ADV_i$ (i=1–p) indicating the sendout of data and addresses $OBNO_i$ (i=1–p) of operand buffer 216 (FIG. 2) at which the data are to be temporarily stored are sent from the memory 1 to the instruction control unit 2. In the present embodiment, $OBNO_i$ (i=1–p) correspond to the input pointers $QIP_i$ (i=1–p), because the instruction queue 211 (FIG. 2) and the operand buffer 216 (FIG. 2 ) have one-to-one correspondence and they are controlled by the same input/output pointer, as will be explained later.

The instruction control unit 2 selects up to m continuous instructions in the order of execution from the decoded instruction, and simultaneously sets up those instructions and associated information in the execution unit 3. To this end, m sets of signal lines for m instructions for setting up the information are provided. They are called set-up ports i (i=1–m). The information set up in the input exchange circuit 8 includes an instruction $INST_i$ (i=1–m) a register operand $RD_i$ (i=1–m), memory operand $MD_i$ (i=1–m), an operand address $MA_i$ (i=1–m) and a write register number $RWA_i$ (i=1–m), for each set-up port i (i=1–m). The information set up in the execution control unit 7 includes a valid instruction signal $IRDY_i$ (i=1–m) which identifies a valid one of the instructions set up by the set-up ports i (i=1–m), an execution unit number $ENO_i$ (i=1–m) for executing the instruction, decode information $BC_i$ (i=1–m) indicating a conditional branch instruction, an M1 field (mask) $BCM_i$ (i=1–m) of the conditional branch instruction and an operand wait signal $ADVW_i$ (i=1–m) indicating that the readout of memory operand is delayed. In order to control the set-up of the instructions, the instruction control unit 2 receives from the execution control unit a signal $OBT_i$ (i=1–m) indicating the end of set-up, a last start time signal LBOP indicating the last time of the execution start times for the instructions simultaneously set up, and a signal LINO indicating the number of instructions simultaneously set up, for each of the set-up ports i (i=1–m). The instruction control unit 2 further receives from the execution control unit a branch condition accept signal TKN of the conditional branch instruction, and a signal INT indicating the occurrence of interruption.

The instruction control unit 2 receives from the output exchange circuit 9 an execution result $ED_i$ (i=1–m) for the set-up port i (i=1–m), a register write command $RWC_i$ (i=1–m) and a write register number $RWA_i$ (i=1–m), and writes the results into the general register stack 200.

The execution units 4, 5 and 6 each may execute only specific type of instruction group or all instructions. Input data necessary for execution and execution control information are sent from the input exchange circuit 8 to each execution unit. The input data to the execution unit $E_i$ (i=1–m) includes an operation code $INSTE_i$, a register operand $RDE_i$, a memory operand $MDE_i$, an operand address $MAE_i$ and a write register number $RWAE_i$. The execution control information includes a set-up end signal $OBTE_i$, an execution permit signal $EXE_i$ and an execution cancel signal $RESE_i$. Each execution unit $E_i$ sends execution output data and execution control information to the output exchange circuit 9. The output of the execution unit $E_i$ includes an execution result $EDE_i$, register write command $RWCE_i$ for the result, a write register number $RWAE_i$, a memory write command $STCE_i$ for the result, a write memory address $STAE_i$, a signal $CCSE_i$ indicating modification of a condition code, and a condition code $CCE_i$. The execution control information includes a signal $EOPE_i$ indicating an end of execution, a signal $INTCE_i$ indicating occurrence of competition type interrupt condition, and a signal $INTSE_i$ indicating occurrence of suppression type interrupt condition.

The execution cancel signal RES is applied to all execution units $E_i$ (i=1–n) from the execution control unit 7. The execution cancel signal RES is "1" when the interrupt condition occurs or a branch prediction fails for a conditional branch instruction. In this case, the execution unit $E_i$ (i=1–n) cancels the execution of the succeeding instructions. Particularly, it suppresses the register write command $RWCE_i$ (i=1–n) and the memory write command $MWCE_i$ (i=1–n) to prevent the result of the instruction to be cancelled as a result of being written. At the same time, the execution end signals $EOPE_i$ (i=1–n) of all execution units $E_i$ (i=1–n) are rendered "1".

The execution unit $E_i$ reads the input data in synchronism with the set-up end signal $OBTE_i$. Thereafter, the instruction is executed in one to several cycles depending on the instruction and operands, and the execution in each cycle is permitted only when the signal $EXE_i$ is "1". When the signal $EXE_i$ is "0", the execution is reserved. The signal $EXE_i$ is "0" when a necessary memory operand has not yet been received. When the signal $RESE_i$ is "1", the execution unit $E_i$ immediately cancels the execution, and the register write command $RWCE_i$ and the memory write command $MWCE_i$ are suppressed to prevent the result of the instruction to be cancelled a result of being written, and the execution end signal $EOPE_i$ is rendered "1". The control for complex instruction execution is done by microprogram control, and the control for simple instruction execution is done by a conventional logic circuit.

Figure 11:
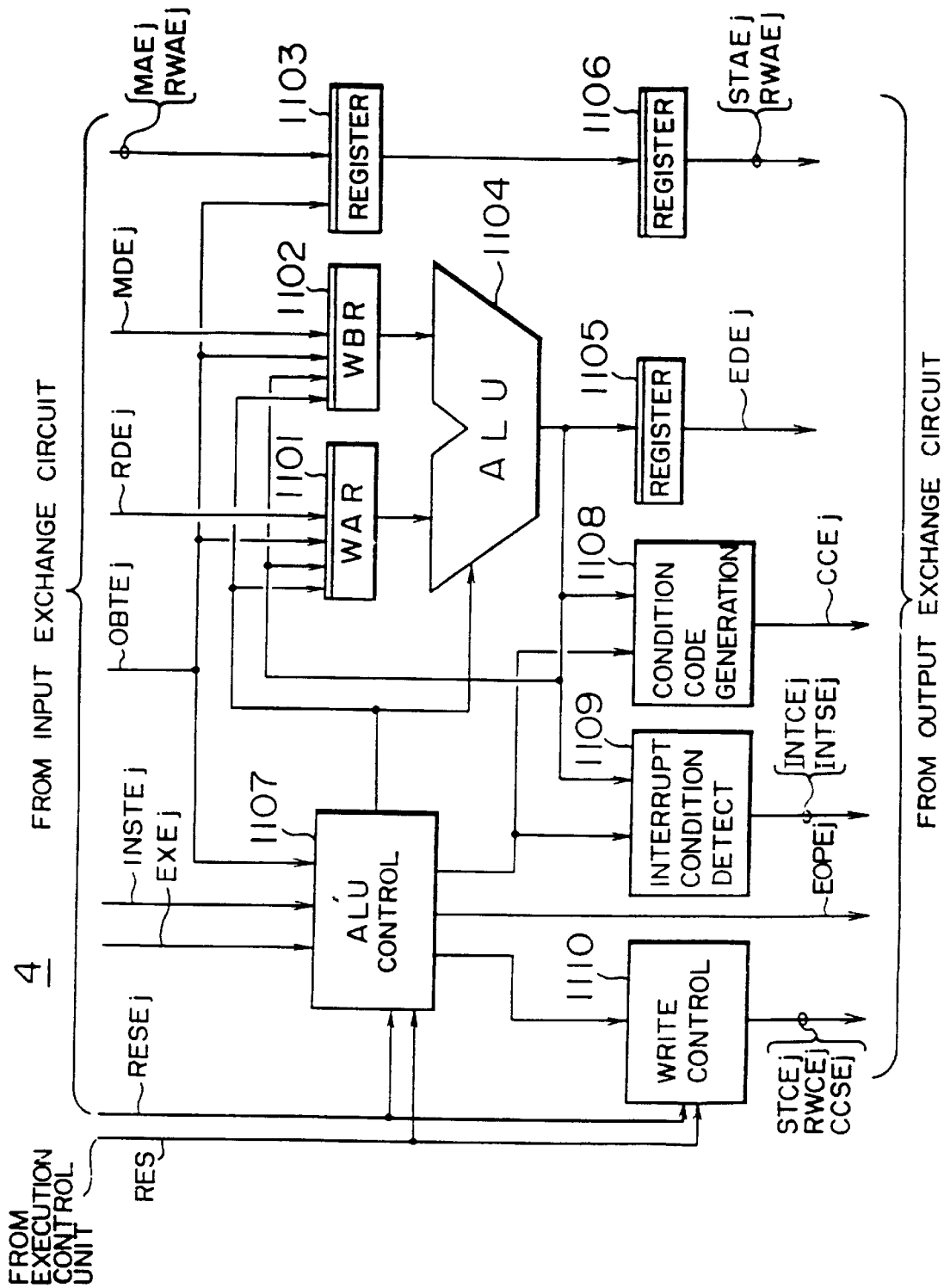
FIG. 11 shows a configuration of an operation unit 4, 5, 6 of FIG. 1.

FIG. 11 shows a configuration of the j-th execution unit $E_j$. Numerals 1101 and 1102 denote work registers which hold operands. A register operand $RDE_j$ is supplied to the register 1101 from the input exchange circuit, a memory operand $MDE_j$ is supplied to the register 1101 from the input exchange circuit, and an instruction set-up end signal $OBTE_j$ is supplied to both registers. When the signal $OBTE_j$ is "1", the work registers 1101 and 1102 read the signal $RDE_j$ and the signal $MDE_j$, respectively. Numeral 1103 denotes a register which receives the signal $OBTE_j$ from the input exchange circuit, and when it is "1", reads an operand address $MAE_j$ and a write resister address $RWAE_j$. Numeral 1104 denotes an arithmetic logic circuit ALU, which comprises an adder/subtractor, a shifter and an arithmetic and logic circuit. Operands are supplied to the ALU 1104 from the work registers 1101 and 1102, and an ALU control signal is supplied to the ALU 1104 from an ALU control circuit 1107 to execute the instruction. An output data bus of the ALU 1104 is connected to the work register 1101 and 1102 to enable execution over a plurality of cycles. The ALU control circuit 1107 supplies a data read control signal to the work registers 1101 and 1102. The signals $OBTE_j$, $INSTE_j$ and $EXE_j$ are supplied to the ALU control circuit 1107. The ALU control circuit 1107 is a conventional one which comprises a microprogram and an execution control circuit therefor. When the signal $OBTE_j$ is "1", the ALU control circuit 1107 reads the signal $INSTE_j$ and reads the first microinstruction of the microprogram corresponding to the instruction. For the instruction whose execution stage completes in one cycle, the end of execution is specified to the first microinstruction, and for the instruction whose execution stage needs a plurality of cycles, the end of execution is specified to the microinstruction which controls the last operation stage, and signal $EOPE_j$ is an output representing the end of execution. The microinstruction designates the ALU control For each execution cycle but it is actually executed when the signal $EXE_j$ is "1". Numeral 1108 denotes a condition code generator which receives the execution result from the ALU and the condition code generation information from the ALU control circuit 1107 and generates the condition code $CCE_i$ one cycle after the execution stage. Numeral 1109 denotes an interrupt condition detector which receives the execution result from the ALU and the interrupt detect control information from the ALU control circuit 1107 and generates interrupt condition generation signals $INTCE_j$ and $INTSE_j$ one cycle after the execution stage. Numeral 1110 denotes a write control circuit which receives result write control information from the ALU control circuit 1107 and generates signals $STCE_j$, $RWCE_j$ and $CCSE_j$ one cycle after the execution stage. The control circuit 1110 also receives the signal $RESE_j$ from the input exchange circuit 8 and the signal RES from the execution control unit 7, and when either one of them is "1", immediately suppresses the signals $STCE_j$, $RWCE_j$ and $CCSE_j$ to "0". The signals RES and $RES_j$ are also supplied to the ALU control circuit 1107, and when any one of them is "1", the ALU control by the ALU control circuit 1107 is canceled. Numerals 1105 and 1106 denote pipeline registers which hold the execution results, write memory address and write register number, and they output signals $EDE_j$, $STAE_j$ and $RWAE_j$ one cycle after the execution stage. The execution units E1 to En each have circuits corresponding to the ALU control circuit 1107 and the write control circuit 1110, and the response to the signals RES and $RES_i$ is the same as described above.

The execution control unit 7 controls the parallel execution of the instructions by the plurality of execution units. It watches the execution end signal $EOP_i$ (i=1–m), and when all instructions have been executed, it issues a set-up end signal $OBT_i$ (i=1–m) to up to m succeeding instructions designated by the valid instruction signal $IRDY_i$ (i=1–m) and sends them to the instruction control unit 2 and the input exchange circuit 8. It also reads an execution unit number $ENO_i$ (i=1–m) sent from the instruction control unit 2, holds it during the execution of the set-up instructions, and sends it to the input exchange circuit 8 and the output exchange circuit 9.

The execution control unit 7 monitors the operand wait signal $ADVW_i$ (i=1–m), and if there is an instruction whose memory operand has not yet arrived, it renders the execution permit signals $EX_i$ (i=1–m) of that instruction and succeeding instruction to "0". Thus, the succeeding instructions are prevented from being executed earlier.

The execution control unit 7 determines a branch condition of a conditional branch signal and sends a branch success signal TKN to the instruction control unit 2. It receives a condition code change signal $CCS_i$ (i=1–m) and a condition code $CC_i$ (i=1–m) from the output exchange circuit 9. In the present embodiment, when the conditional branch instruction is decoded, it is predicted that the branch instruction will fail as is done in a conventional computer, and succeeding instructions are decoded. Accordingly, since the "1" branch success signal means the failure of prediction, the instruction which is currently being decoded by the instruction control unit 2 is cancelled and the instruction on the target stream is decoded. The signal $RES_i$ (i=1–m) which indicates the cancellation of the execution of the succeeding instruction to the instruction currently being executed is sent to the input exchange circuit 8.

The execution control unit 7 receives interrupt condition generate signals $INTC_i$ (i=1–m) and $INTS_i$ (i=1–m) for the instruction being executed, from the output exchange circuit 9, and when a completion type interrupt condition occurs, it cancels the execution of the succeeding instruction to the instruction for which the interrupt condition has occurred, and when a suppression type interrupt condition occurs, it generates a cancel signal $RES_i$ (i=1–m) to cancel the execution of the instruction for which the interrupt condition has occurred and the succeeding instructions. It further sends to all execution units a cancel command signal RES to cancel the execution of the succeeding instruction group which have been set up immediately thereafter. It also sends an interrupt signal INT to the instruction control unit 2.

The input exchange circuit 8 sends the set-up data for m instructions which are set up through the set-up ports i (i=1–m), for each of the execution units which execute those instructions. It receives the execution unit number $ENO_i$ (i=1–m) from the execution control unit 7 for each set-up port.

The output exchange circuit 9 receives the output data and execution control information from the execution unit i (i=1–n) and rearranges them in the order of set-up ports i (i=1–m). It receives the execution unit number $ENO_i$ (i=1–m) from the execution control unit 7. The output information is sent to each unit, as described above. For the execution result to be written into the memory 1, the data $ED_i$ (i=1–m), address $STA_i$ (i=1–m) and memory write command $STC_i$ (i=1–m) are sent to the memory 1. The memory 1 receives them and writes them into the memory 1.

Figure 2:
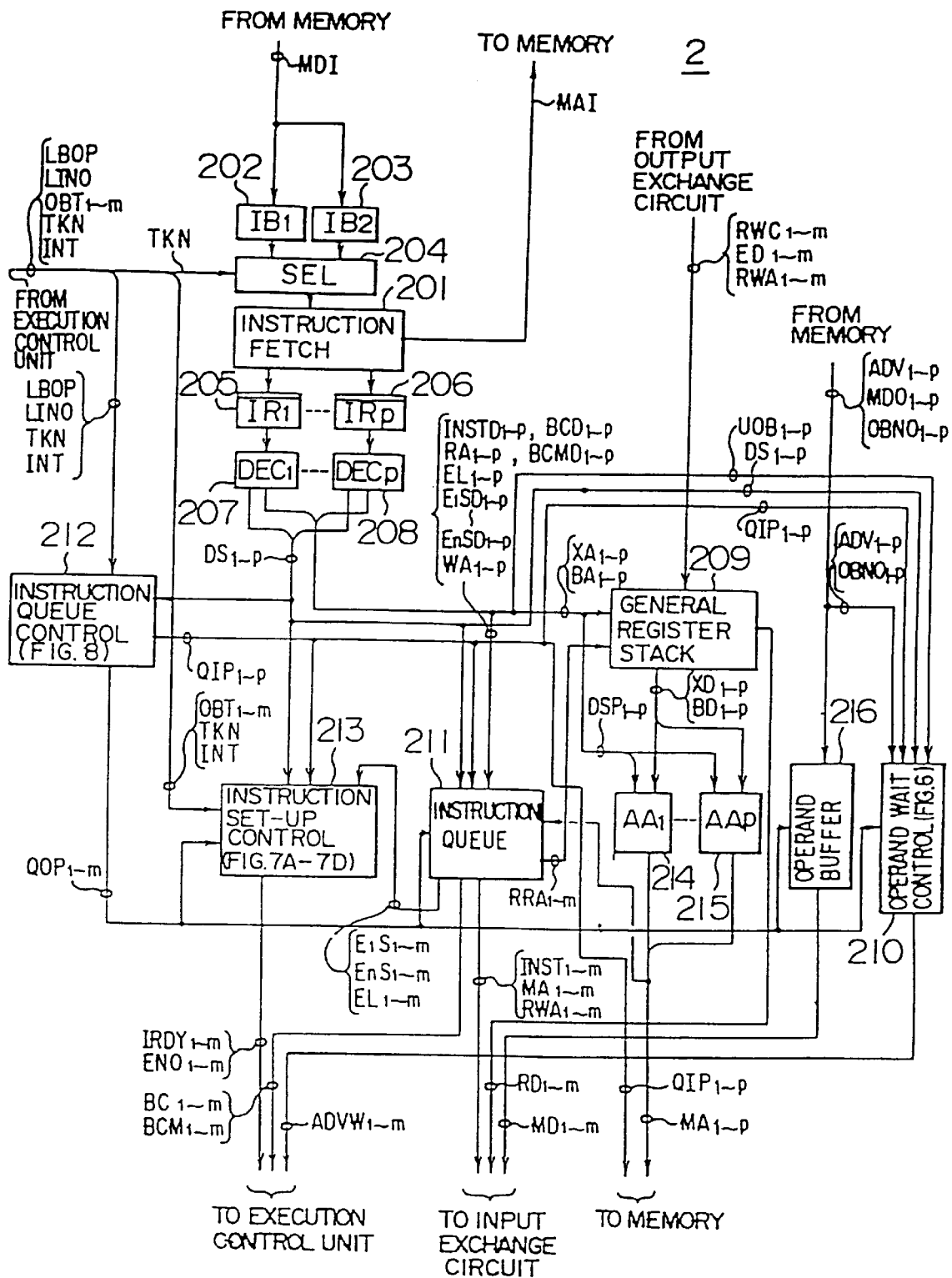
FIG. 2 shows a detailed diagram of an instruction control unit 2 of FIG. 1.

FIG. 2 shows a detailed configuration of an instruction control unit 2. Numeral 201 denotes an instruction fetch circuit which monitors a vacant state of a prefetch instruction buffer 202, and if it is vacant, it sends an instruction fetch address MAI to the memory 1 and sets the fetched instruction data MDI into the instruction buffer 202. Usually, several continuous instructions are fetched in one instruction fetching. Accordingly, the prefetch instruction buffer 202 has a capacity which is at least as large as the size of the instructions fetched in one fetching. Another instruction buffer 203 for storing a target instruction sequence for a branch instruction is provided. Before branch success for the branch instruction is detected, a selector 204 selects the prefetch instruction buffer 202 and sends the content thereof to the instruction fetch circuit 201. When the branch success for the branch instruction is detected, the execution control unit sends a branch success signal TKN to the selector 204, which responds thereto to select the instruction buffer 203 and send the content thereof to the instruction fetch circuit 201. The above instruction fetch control is not typical one in a conventional general purpose computer and it can be readily attained by conventional means.

Numerals 205 and 206 denote p instruction registers. The instruction fetch circuit 201 extracts p continuous instructions from an instruction sequence on the instruction buffer 202 or 203 selected by the selector 204 and sets them in order in the instruction registers 205 and 206. The instruction fetch circuit 201 may be one disclosed in JP-A-58-176751 entitled "Instruction Decode Unit". Numerals 207 and 208 denote p instruction decoders which decode instructions for the instruction registers 205 and 206 and output the decoded information. As the decoded information, each of the decoders $DEC_i$ (i=1–p) sequentially sends an instruction index register designation field $XA_i$ (i=1–p) and a base register designation field $BA_i$ (i=1–p) to a general register stack 209, an address displacement field $DSP_i$ (i=1–p) to p address adders 214 and 215, and information $UOB_i$ (i=1–p) indicating an instruction which uses a memory operand to an operand wait control circuit 210. As further decoded information, an instruction code $INSTD_i$ (i=1–p), a register operand number $RA_i$ (i=1–p), a write register number $WA_i$ (i=1–p) for storing an execution result, a number of instruction execution cycles $EL_i$ (i=1–p), information $E1SD_i$ (i=1–p) $E2SD_i$ (i=1–p), . . . , $EnSD_i$ (i=1–p) indicating that the instruction can be executed by the execution unit $E_i$ (i=1–n), information $BCD_i$ (i=1–p) indicating that the instruction is a conditional branch instruction, and a mask value $BCMD_i$ (i=1–p) of the conditional branch instruction are sent to an instruction queue 211. A signal $DS_i$ (i=1–p) indicating that the instruction has been decoded is sent from the decoder $DEC_i$ (i=1–p) to an instruction queue control circuit 212, an instruction set-up control circuit 213, the instruction queue 211 and an operand wait control circuit 210.

The general register stack 209 comprises 16 4-byte registers designated by the instruction. They receive the index register designation field $XA_i$ (i=1–p) and the base register designation field $BA_i$ (i=1–D) from the decoders 207 and 208, read the content of the register of the designated number, and sequentially send them to an address adder $AA_i$ (i=1–p) as index register data $XD_i$ (i=1–p) and base register data $BD_i$ (i=1–p). The general register stack 209 receives register operand numbers $RRA_i$ (1=1–m) for m set-up ports from the instruction queue 211, reads the contents of the registers designated thereby, and sends them to the input exchange circuit 8 as register operand data $RD_i$ (i=1–m). The general register stack 209 further receives from the output exchange circuit 9 execution results $ED_i$ (i=1–m) for m set-up port, write register numbers $RWA_i$(i=1–m) and register write command $RWC_i$ (i=1–m), and writes them into the designated registers. The general register stack 209 simultaneously reads and writes a plurality of instructions and it can be readily attained by conventional means.

The address adder $AA_i$ (i=1–p) receives index register data $XD_i$ (i=1–p), base register data $BD_i$ (i=1–p) and address displacement $DSP_i$ (i=1–p) and sends the execution result thereof to the memory 1 and the instruction queue 211 as the operand address $MA_i$ (i=1–p). If the instruction is not a branch instruction, the operand address $MA_i$ (i=1–p) is an address of the memory operand, and the data read from the memory 1 is sent to an operand buffer 216 by a data signal $MO_i$ (i=1–p). On the other hand, if the instruction is the branch instruction, a target instruction address corresponds to the memory operand address $MA_i$ (i=1–p), and the data read from the memory 1 is sent to the instruction buffer 202 or 203 by a data signal MDI.

The instruction queue 211 comprises a k-instruction queue register and an input/output circuit thereof. The number k is no smaller than p or m. The instruction queue 211 receives decode information for p continuous instructions from the decoder $DEC_i$ (i=1–p) and simultaneously queues them. The instructions actually queued are those having "1" corresponding decode end signals $DS_i$ (i=1–p), and they are set into the queue registers pointed by input pointers $QIP_i$ (i=1–p). The contents of the input pointers $QIP_i$ (i=1–p) sequentially point p continuous queue registers next to the queue register for the latest instruction in the instruction queue. The k-th cueue register is followed by the first queue resister. The decode information of up to m continuous instructions starting from the oldest instruction in the uueue are simultaneously read from the instruction queue. thus, the m output pointers $QOP_i$ (i=1–m) sequentially point m continuous queue registers starting from the oldest instruction in the queue. The m-instruction output pointed by the output pointers $QOP_i$ (i=1–m) is the content of the m set-up ports. If the valid instruction signal IRDY$_i$ (i=1–m) supplied by the instruction set-up control circuit 213 is "1", it is deemed that the instruction has been actually fetched. As the output of the instruction queue, an instruction code INST$_i$ (i=1–m), an operand address MA$_i$ (i=1–m), a write register number RWA$_i$ (i=1–m) are sent to the input exchange circuit 8, a register operand number RRA$_i$ (i=1–m) is sent to the general register 209, a conditional branch instruction indication BC$_i$ (i=1–p) and a mask value BCM$_i$ (i=1–p) of the conditional branch instruction are sent to the execution control unit 7, and the number of execution cycles EL$_i$ (i=1–m) and executable indication information E1S$_i$ (i=1–m), E2S$_i$ (i=1–m), . . . , EnS$_i$ (i=1–m) of the execution unit E$_i$ (i=1–n) are sent to the instruction set-up control circuit 213.

The operand buffer 216 comprises k buffer registers (not shown) for holding operand data MDO$_i$ (i=1–p) sent from the memory 1 and input/output circuits together. When the operand buffer 216 receives an advance signal ADV$_i$ (1=i–p) from the memory 1, it stores the operand data MDO$_i$ (i=1–p) into the buffer register designated by the operand number OBNO$_i$ (i=1–p). The operand buffer 216 stores up to p data. In the present embodiment, the k buffer registers correspond to k queue registers of the instruction queue. For the instruction which needs a memory operand, the queue register for storing the decode information and the buffer register for storing the memory operand have the same number.

The operand buffer 216 simultaneously reads up to m instructions operand data MD$_i$ (i=1–m) for the set-up ports and sends them to the input exchange circuit 8. The operand buffer 216 receives the instruction queue output pointer QOP$_i$ (i=1–p) from the instruction queue control circuit 212.

The instruction queue control circuit 212 generates p input pointers QIP$_i$ (i=1–p) of the instruction queue 211 and m output pointer QOP$_i$ (i=1–m). It sends the input pointers QIP$_i$ (i=1–p) to the instruction set-up control circuit 213, instruction queue 211, operand queue control circuit 210, and memory 1. The control circuit 212 sends the output pointer QOP$_i$ (i=1–m) to the instruction set-up control circuit 213, instruction queue 211, operand queue control circuit 210 and operand buffer 216. The control circuit 212 also receives a decode end signal DS$_i$ (i=1–p) from the decoder DEC$_i$ (i=1–p), a last start time signal LBOP, in instruction count signal LINO, a branch success signal TKN and an interrupt signal INT from the execution control unit 7.

Figure 8:
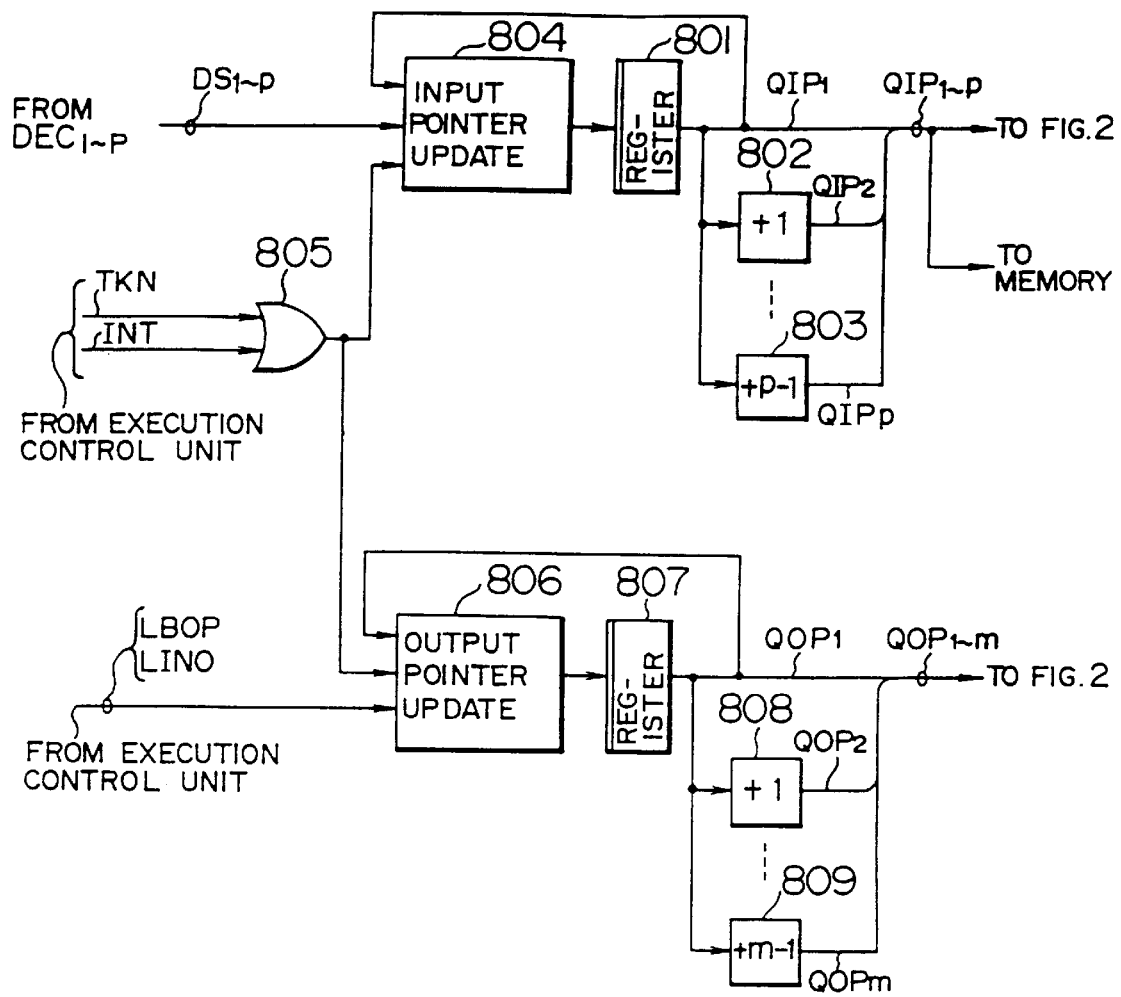
FIG. 8 shows a detailed diagram of an instruction queue control circuit 212 of FIG. 2.

A more detailed configuration of the instruction queue control circuit 212 is shown in FIG. 8. Numeral 801 denotes a register for holding QIP$_i$ (i=1–m). Numerals 802 and 803 denote constant incrementers which receive the content of the register 801, sequentially add 1, . . . , p–1 thereto (in modulo p) and has an output of the resulting sums as the input pointers QIP2–QIPp. Numeral 804 denotes an input pointer update circuit which receives p decode and signals DS$_i$ (i=1–p) and the input pointer QIP1, adds the number of "1" branch success signals DS$_i$ (i=1–p) and the content of the input pointer QIP1 in modulo p, and sets the result into the register 801. For example, if there are two instructions which have been simultaneously decoded, the signals DS1 and DS2 are "1" and the signals DS3–DSp are "0". The decode information of those two instructions are stored into queue registers (not shown) pointed by the input pointers QIP1 and QIP2. The content of the register 801 is incremented by two. An initial value of the register 801 is zero. Namely, it is previously set to zero for executing the first instruction. Numeral 805 denotes an OR gate which receives the branch success signal TKN and interrupt detect signal INT from the execution control unit 7, outputs a logical OR thereof, and sends it to the input pointer update circuit 804 and the output pointer update circuit 806. When the output of the OR gate 805 is "1", the output pointer update circuit 804 sets the register 801 to "0". Since it means prediction failure when the conditional branch instruction succeeds the branch, all succeeding instructions in the instruction queue are invalidated and the execution should be resumed from the decoding of the target instruction. This is the reason why the register 801 is set to "0".

Numeral 807 denotes a register for holding QOP1. Numerals 808 and 809 denote (m–1) incrementers which receive the content of the register 807 and output values incremented by 1, . . . , (m–1) in modulo m as output pointer signals QOP$_j$ (j=2–m). The output pointer update circuit 806 receives the content of the register 807, the last start time signal LBOP from the execution control unit 7 and the instruction count LINO, and when the signal LBOP is "1", it adds the signal LINO and the content of the register 807 in modulo m, and sets the sum into the register 807. The register 807 is initially set to "0" as the register 801 is done. When the output of the OR gate 805 is "1", the register 807 is set to "0" by the same reason for the input pointer.

The instruction set-up control circuit 213 of FIG. 2 selects up to m settable instructions from the decoded instructions in the instruction queue 211 and displays them by the valid instruction signal IRDY$_i$ (i=1–m). The control ciruict 213 displays, by the valid signal IRDY$_i$ (i=1–m) those set-up ports i (i=1–m) for m instructions parallelly sent from the instruction queue 211 to the logic circuits which bear decode information of valid instructions. The instruction which corresponds to "1" valid instruction signal IRDY$_i$ (i=1–m) is valid and it is to be next set up. A condition for a group of instructions which can be set up in one cycle is as follows.

(1) The group of instructions which can be set up comprise up to m instructions with a first instruction thereof being the oldest instruction in the instruction queue or the instruction to be first executed in the order of execution in the program.

(2) There are a sufficient number of execution units having functions to parallelly execute all instructions in the instruction group.

(3) For two adjacent instructions in the instruction group, the number of execution cycles for the succeeding instruction is equal to or larger than the number of execution cycles of the preceding instruction.

The instruction set-up control circuit 213 determines an execution unit which executes each of the set-up instructions, and sends a signal END$_i$ (i=1–m) indicating the execution unit number to the execution control unit 7.

Figure 7A:
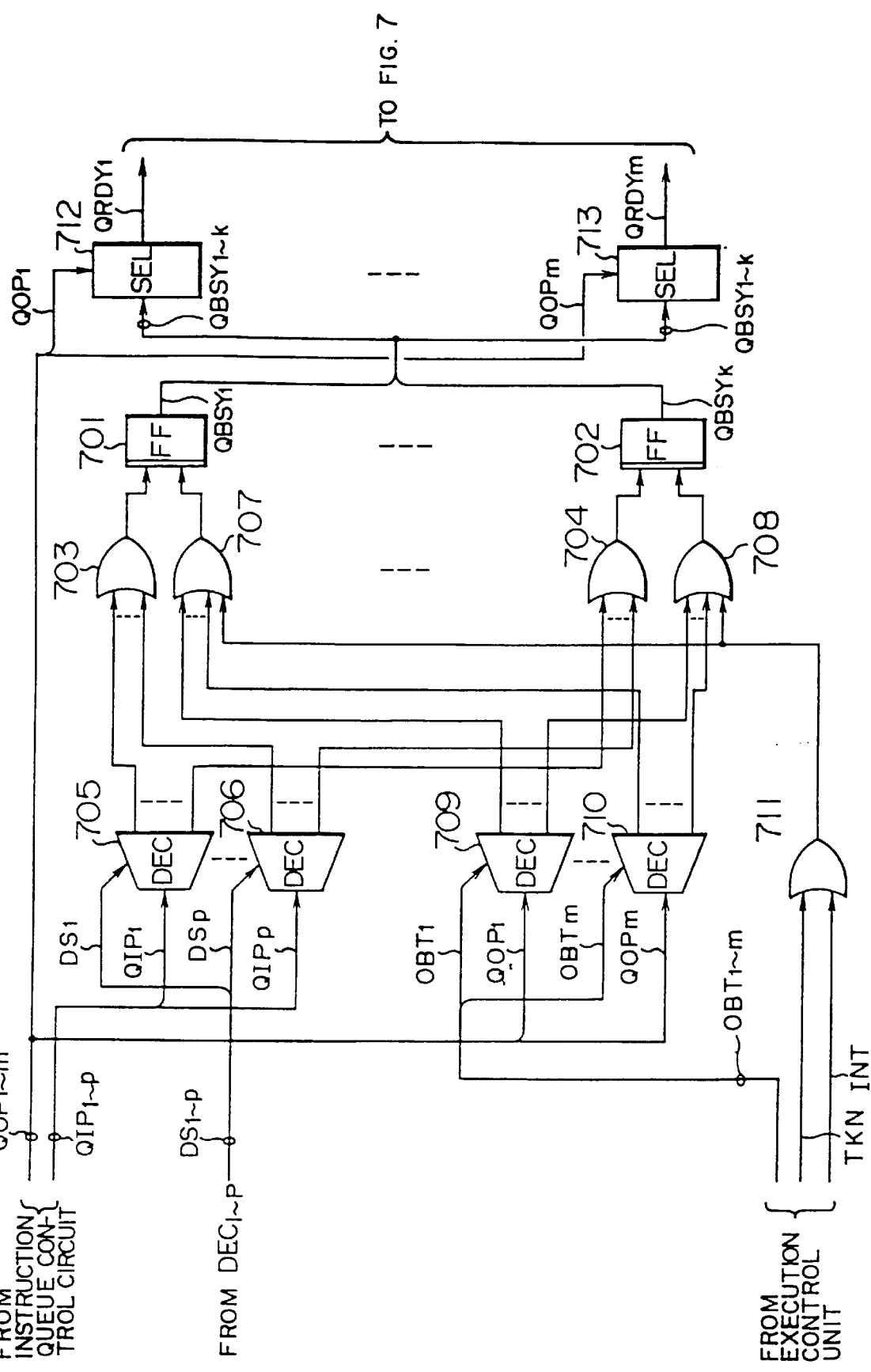

The instruction set-up control circuit 213 which generates an instruction valid signal IRDY$_i$ (i=1–m) and a signal END$_i$ (i=1–m) which meets the conditions (1)–(3) is explained in detail with reference to FIGS. 7A to 7D. FIG. 7A shows a circuit for generating a signal QRDY$_i$ (i=1–m) indicating the necessary condition. Numerals 701 and 702 denote k flip-flops which correspond to k queue registers (not shown) of the instruction queue and indicate that decoded instructions which are ready to be set up are stored in the queue registers. Numerals 703 and 704 denote k OR gates which correspond to the flip-flops 701 and 702 and send signals to set the flip-flops to "1". Numerals 705 and 706 denote p decoders which correspond to p instruction decoders DEC$_i$ (i=1–p) shown in FIG. 2 and which sequentially receive instruction decode and signals DS$_i$ (i=1–p) and instruction queue input pointer signals $QIP_i$ (i=1–p) and sequentially send k decode outputs to OR gates 703 and 704. When the instruction decode end signal is "1", the decoder 705 or 706 renders the decode output signal corresponding to the queue register pointed by the instruction queue input pointer signal to "1". The corresponding one of the OR gates 703 and 704 outputs a "1" signal so that the corresponding flip-flop is set to "1". When two or more instructions have simultaneously been decoded, as many instruction decode end signals as the number of those instructions counted from the signal DS1 is set to "1", and as many flip-flops as the number of those instructions, which are continuous starting from the flip-flop pointed by the input pointer QIP1 are set to "1". Numerals 707 and 708 denote k OR gates which correspond to the flip-flops 701 and 702 and send signals to reset the flip-flops to "0". Numerals 709 and 710 denote m decoders which correspond to m-instruction output ports of the output exchange circuit 9, or set-up ports i (i=1–m), and which sequentially receive the set-up end signals $OBT_i$ (i=1–m) and instruction queue output pointer signals $QOP_i$ (i=1–m) and sequentially send k decode outputs to the OR gates 707 and 708. When the set-up end signal is "1". the decoders 709 and 710 set the decode output signals corresponding to the queue register pointed by the instruction queue output pointer signal to "1". The corresponding one of the OR gates 707 and 708 outputs "1" signal so that the corresponding flip-flop is reset to "0". When two or more instructions have simultaneously been decoded, as many set-up end signals as the number of those instructions counted from the signal OBT1 are set to "1", and as many flip-flops as the number of those instructions which are continuous starting from the flip-flop pointed by the output pointer QOP1 are reset to "0". Numeral 711 denotes an OR gate which sends a logical OR of the signal TKN sent from the execution control unit 7 and the signal INT to the OR gates 707 and 708. Accordingly, when the conditional branch instruction succeeds the branch, that is, when prediction fails, or when an interrupt condition occurs and subsequent instruction execution is to be cancelled, the signals TKN and INT are set to "1" and all flip-flops 701 and 702 are reset to "0" through the OR gates 711, 707 and 708. Numerals 712 and 713 denote m selectors which correspond to the set-up ports i (i=1–m). Each of the selectors receives k queue busy signals $QBSY_i$ (i=1–k) from the flip-flops 701 and 702. Each selector also receives the instruction queue output pointer $QOP_i$ (i=1–m), selects the queue busy signal $QBSY_i$ (i=1–k) which corresponds to the queue register pointed by the pointer $QOP_i$ (i=1–m), and outputs it as a signal $QRDY_i$ (i=1–m).

In the present invention, up to p continuous instructions are stored in the instruction queue continuously to the previously queued instructions, and up to m continuous instructions are fetched for set-up. The pointer $QOP_i$ (i=1–m) points m continuous queue registers starting from the queue register which stores the oldest one of the decoded instructions. When there are i decoded instructions, $QRDY_j$ (j=1–i) is "1" and $ORDY_j$ (j=1+i–m) is "0" if i is smaller than m, and $QRDY_i$ (i=1–m) is "1" if i is no smaller than m. It is thus seen that the signal $QRDY_i$ (i=1–m) indicates the condition (1).

Figure 7B:
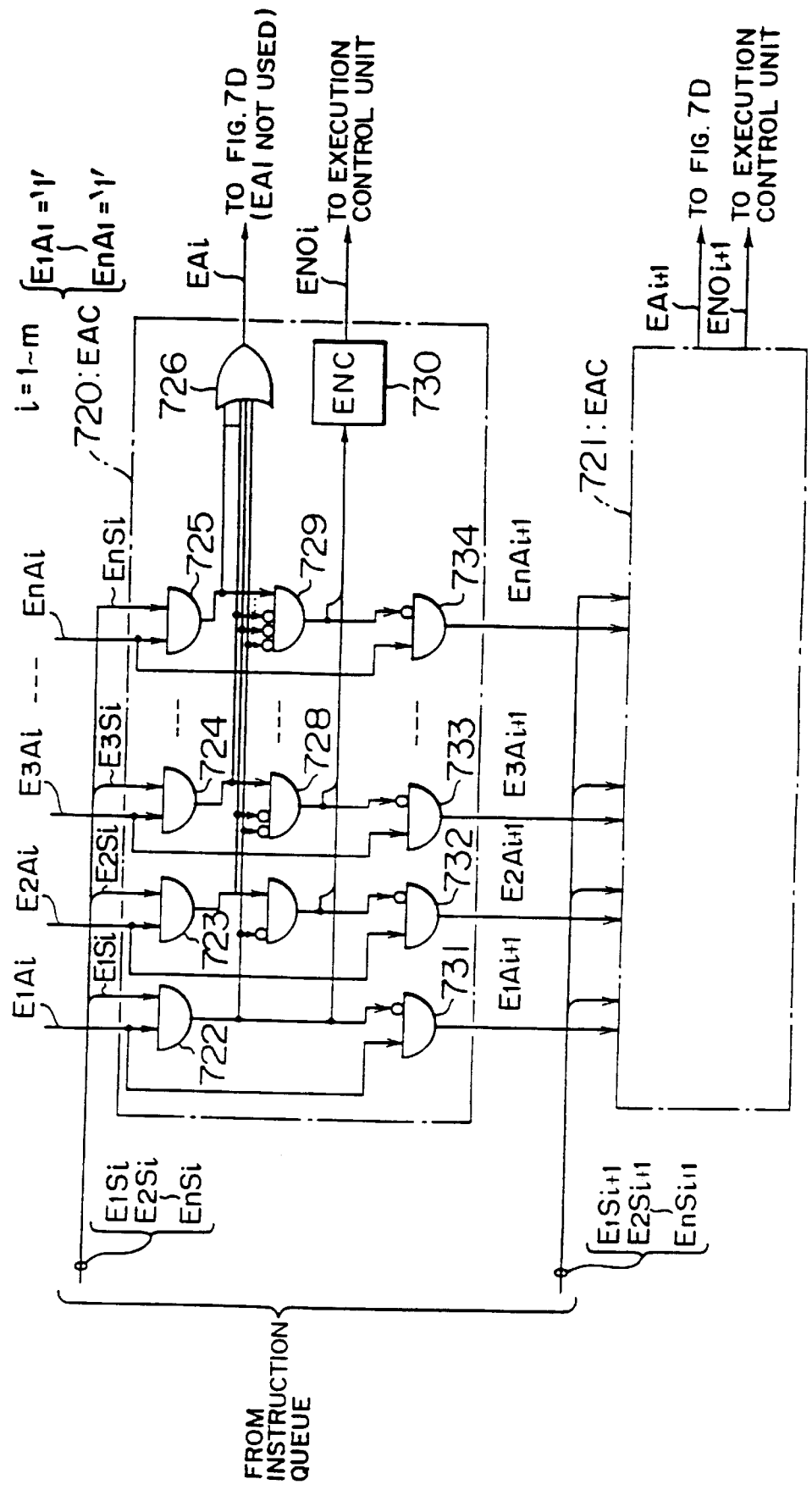

FIG. 7B shows a circuit for generating m–1 signals $EA_i$ (i=2–m) indicating necessary conditions for the signals $IRDY_i$ (i=1–m) to meet the condition (2). It also has a function to determine the execution unit number $ENO_i$ (i=1–m) which executes the instruction set up through the set-up port i (i=1–m). Numerals 720 and 721 denote execution unit assignment control circuits EAC which generate signals $EA_i$, $ENO_i$ and $EA_{i+1}$, $ENO_{i+1}$ for the i-th and (i+1)th instructions of up to m instructions set up through the set-up ports. There are m circuits EAC, one for each of the set-up ports i (i=1–m). Numerals 722 to 725 denote n AND gates, one for each of the execution units. Each of the AND gates receives a signal $E1A_i$, . . . , $EnA_i$ indicating a vacant state of the i-th instruction and an instruction decode information $E1S_i$, . . . , $EnS_i$ indicating to the execution unit whether it has a function to execute the i-th instruction, and outputs a logical AND thereof. If the logical AND is "1", it means that the corresponding execution unit is vacant and it has the function to execute the instruction and hence it is a candidate for assignment. Usually, there are more than one candidate execution units for assignment. Numeral 726 denotes an OR gate which logically Ors the outputs of the AND gates 722–725 and outputs it as a signal $EA_i$. If one of the outputs of the AND gates 722–725 is "1", it means that there is an execution unit to which the instruction is to be assigned and hence the signal $EA_i$ is "1". Numerals 727–729 denote n–1 AND gates which, when there are more than one candidates, selects one execution unit for assignment. Each of the AND gates 727–729 outputs a signal "1" when the execution unit E2, . . . , En is assigned. It receives the output signal of the AND gate 723, . . . 725 so that it is conditioned to output the signal "1" when the corresponding execution unit is the candidate. A negative of the output signal of the AND gate 722 is supplied to the AND gates 727–729, and the output signal of the AND gate 723 is inverted and supplied to the AND gates 728–729. In general, an inverted output signal of that one of the AND gates 722–725 which is associated with the execution unit $E_j$ is supplied to that one of the AND gates 727–729 which is associated with the execution unit $E_{j+1}$, . . . , $E_n$. As a result, when there are more than one candidate execution units, only one of the outputs of the n gates 722, 727–729 which is associated with the execution unit having the smallest number is "1", and the remainders are "0". Numeral 730 denotes an encoder which receives the n gate outputs and outputs the execution unit number i corresponding to the "1" output, as a signal $ENO_i$. Numerals 731–734 denote n AND gates, one for each of the execution units, which receive the execution unit vacant state signals $E1A_i$, . . . , $EnA_i$ and the an inverted outputs of the n gates 722, 727–729, and output logical AND thereof as execution unit vacant state signals $E1A_{i+1}$, . . . , $EnA_{i+1}$ for the (i+1)th instruction. As seen from the above description, only those of the signals $E1A_i$, . . . , $EnA_i$ which correspond to those of the signals $E1A_i$, . . . , $EnA_i$ and are associated with the execution unit assigned to the i-th instruction are "0". In the EAC for the first instruction, the execution unit vacant state signals $E1A1$, . . . , $EnA1$ are "1" indicating the vacant state.

Figure 7C:
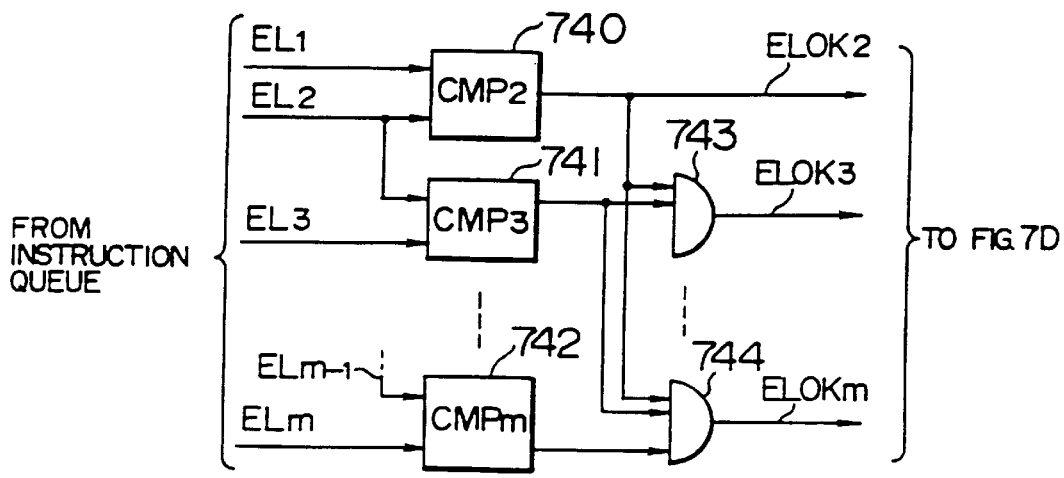

FIG. 7C shows a circuit for generating m–1 signals $ELOK_i$ (i=2–m) indicating necessary conditions for the signal $IRDY_i$ (i=1–m) to meet the condition (3). Numeral 740 denotes a comparator which compares the numbers of execution cycles EL1 and EL2 for the first and second instructions supplied from the instruction queue 211, and if the latter is equal to or larger than the former, outputs a "1" signal ELOK2. Numerals 741 and 742 denote m–2 comparators identical to the comparator 740, for the third to m-th instructions. Each of them compares the number of execution cycles of the current instruction with that of the immediately preceding instruction and outputs a "1" signal when the number of execution cycles for the current instruction is equal to or larger than the preceding. Numerals 743 and 744 denote m–2 AND gates for the third to m-th instructions and output signals $ELOK_i$ (i=3–m). The outputs of the comparators 740 and 741 are supplied to the AND gates 743 and 744. In general, an output of that one of the comparators 741 and 742 which is for the i-th (i>2) instruction is supplied to all of those AND gates 743 and 744 which are for the i-th and subequent instructions. Accordingly, the outputs of the comparators 740 to 742 are supplied to the AND gate 744. Thus, the signal $ELOK_i$ is "1" only when the condition (3) is met for all of the first to i-th instructions.

Figure 7D:
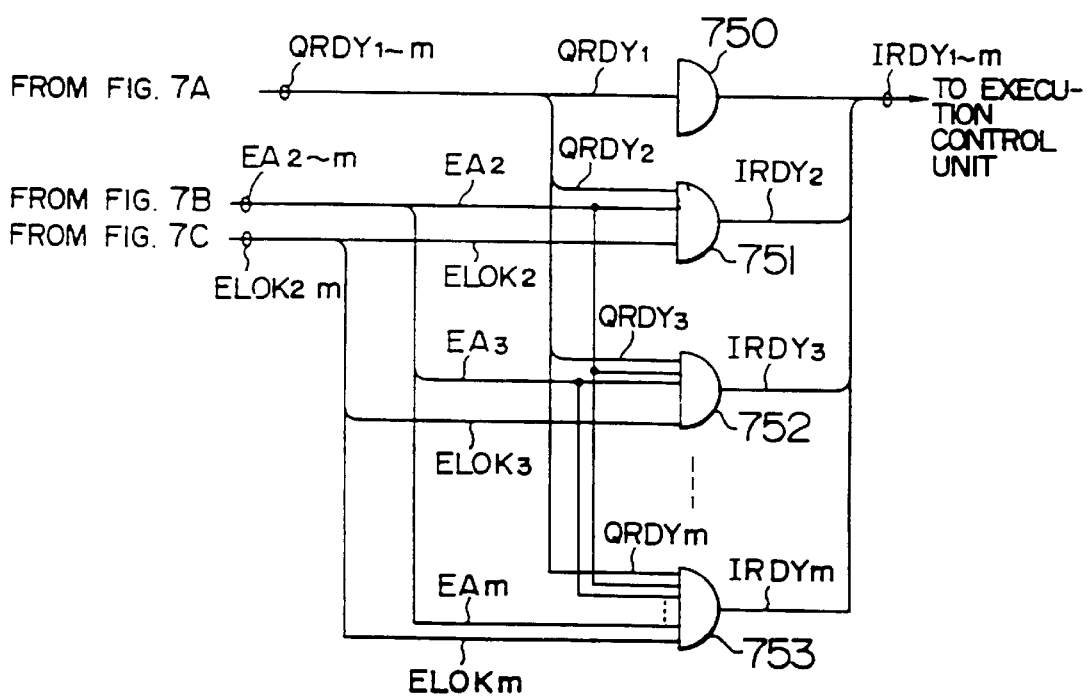

FIG. 7D shows a circuit for generating a valid instruction signal $IRDY_i$ (i=1–m) by using the signals $QRDY_i$ (i=1–m), $EA_i$ (i=2–m) and $ELOK_i$ (i=2–m) explained in FIGS. 7A, 7B and 7C. Numeral 750 denotes an AND gate which receives only the signal QRDY1 and outputs a signal IRDY1. Thus, the decoded instruction pointed by the pointer QOP1 can always be set up. Numerals 751–753 denote AND gates for m−1 instructions (second to m-th instructions) of up to m simultaneously set-up instructions. They receive the signals $QRDY_i$ (i=2–m) and $ELOK_i$ (i=2–m). The signal EA2 is supplied to the AND gates 751–753, and the signal EA3 is supplied to the AND gates 752 and 753. In general, the execution unit assignment signal $EA_i$ for the i-th (i>1) instruction is supplied to those of the gates 751–753 which are for the i-th and subsequent instructions. Accordingly, for example, all of the signals $EA_i$ (i=2–m) are supplied to the gate 753. The gates 751–753 output the logical AND or the inputs thereto as the signals $IRDY_i$ (i=2–m). Thus, the signal $IRDY_i$ (i=1–m) is the valid instruction signal which meets all of the conditions (1)–(3).

The operand wait control circuit 210 of FIG. 2 generates a signal $ADVW_i$ (i=1–m) indicating whether necessary operand data has been read into the operand buffer, for each of up to m set-up instructions, and sends it to the execution control unit 7. It receives the signals $DS_i$ (i=1–p) and $UOB_i$ (i=1–p) from the instruction decoders 207 and 208, the signals $QIP_i$ (i=1–p) and $QOP_i$ (i=1–m) from the instruction queue control circuit 212, and the signals $ADV_i$ (i=1–p) and $OBNO_i$ (i=1–p) from the memory 1.

Figure 6:
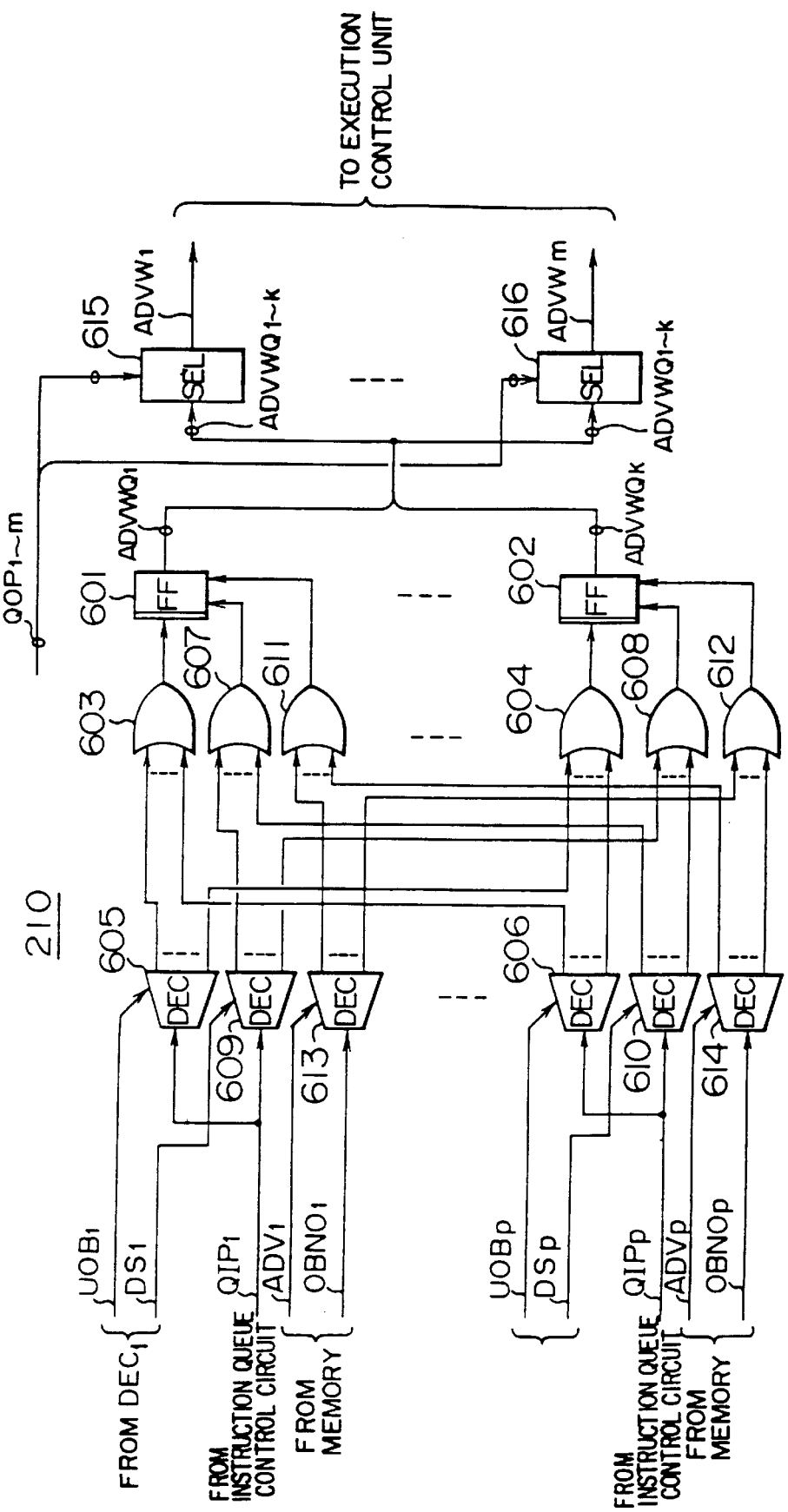
FIG. 6 shows a detailed diagram of an operand wait control circuit 210 of FIG. 2, FIGS. 7A to 7D show detailed diagrams of different portions of an instruction set-up control circuit 213.

The operand wait control circuit 210 is explained in further detail with reference to FIG. 6. Numerals 601 and 602 denote k flip-flops, one for each of k buffer registers of the operand buffer 216. It indicates that a necessary operand has not yet arrived at the buffer register. When the flip-flop is "1", it indicates that an operand is to be read into the corresponding buffer register but it has not yet arrived. When it is "0", it indicates that the operand need not be read into the corresponding buffer register or it has already arrived. Numerals 603 and 604 denote k OR gates which output values to be set into the flip-flops 601 and 602. Numerals 605 and 606 denote p decoders, one for each of the p instruction decoders of FIG. 2, which receive the signals $UOB_i$ (i=1–p) and instruction queue input pointer signals $QIP_i$ (i=1–p) and send k decode outputs to the OR gates 603 and 604. When the signal $UOB_i$ (i=1–p) is "1", the decoders 605, 606 render the decode output signal corresponding to the buffer resister pointed by the instruction queue input pointer signal to "1". The corresponding one of the OR gates 603 and 604 outputs a "1" signal. Numerals 607 and 608 denote k OR gates which send clock signals to the flip-flops 601 and 602 to set the input data from the OR gates 603 and 604. Numerals 609 and 610 denote p decoders, one for each of the p instruction decoders $DEC_i$ (i=1–p) of FIG. 2, which receive the signals $DS_i$ (i=1–p) and the instruction queue input pointer signals $QIP_i$ (i=1–p) and send k decode outputs to the OR gates 607 and 608. When the signal $DS_i$ (i=1–p) is "1", the decoder 609, 610 renders the decode output corresponding to the buffer register pointed by the instruction queue input pointer signal to "1". The corresponding one of the OR gates 607 and 608 outputs a "1" clock signal. As a result, the input data is set into the corresponding flip-flop. When two or more instructions have been simultaneously decoded, as many instruction decode end signals as the number of those instructions counted from DS1 are "1", and as many flip-flops as the number of those instructions which are continuous from the flip-flop pointed by the pointer QIP1 are set by the input data. Numerals 611 and 612 denote k OR gates corresponding to the flip-flops 601 and 602, which send signals to reset the flip-flops to "0". Numerals 613 and 614 denote p decoders corresponding to p output ports from the memory 1, which receive the advance signals $ADV_i$ (i=1–p) and the operand buffer numbers $OBNO_i$ (i=1–p) and send k decode outputs to the OR gates 611 and 612. When the advance signals are "1", that is, when the operand has been sent from the memory 1, the decoder 613, 614 renders the decode output corresponding to the buffer register designated by the operand buffer number to "1". The corresponding one of the OR gates 611 and 612 outputs a "1" signal so that the corresponding flip-flop is reset to "0". When two or more operands are simultaneously read, as many advance signals as the number of operands are "1", and as many flip-flops as the number of operands are reset to "0". Numerals 615 and 616 denote m selectors corresponding to the set-up ports i (i=1–m). Each selector receives k operand wait signals $ADVWQ_i$ (i=1–k) from the flip-flop 601 and 602. Each selector also receives the instruction queue output pointer $QOP_i$ (i=1–m), selects an operand wait signal corresponding to the buffer register pointed by the pointer $QOP_i$ (i=1–m) from the signals $ADVWQ_i$ (i=1–k), and outputs it as the signal $ADVW_i$ (i=1–m). It is thus seen that the signal $ADVW_i$ (i=1–m) indicates that a necessary operand has not arrived at the operand buffer, for each of up to m set-up instructions.

Figure 3B:
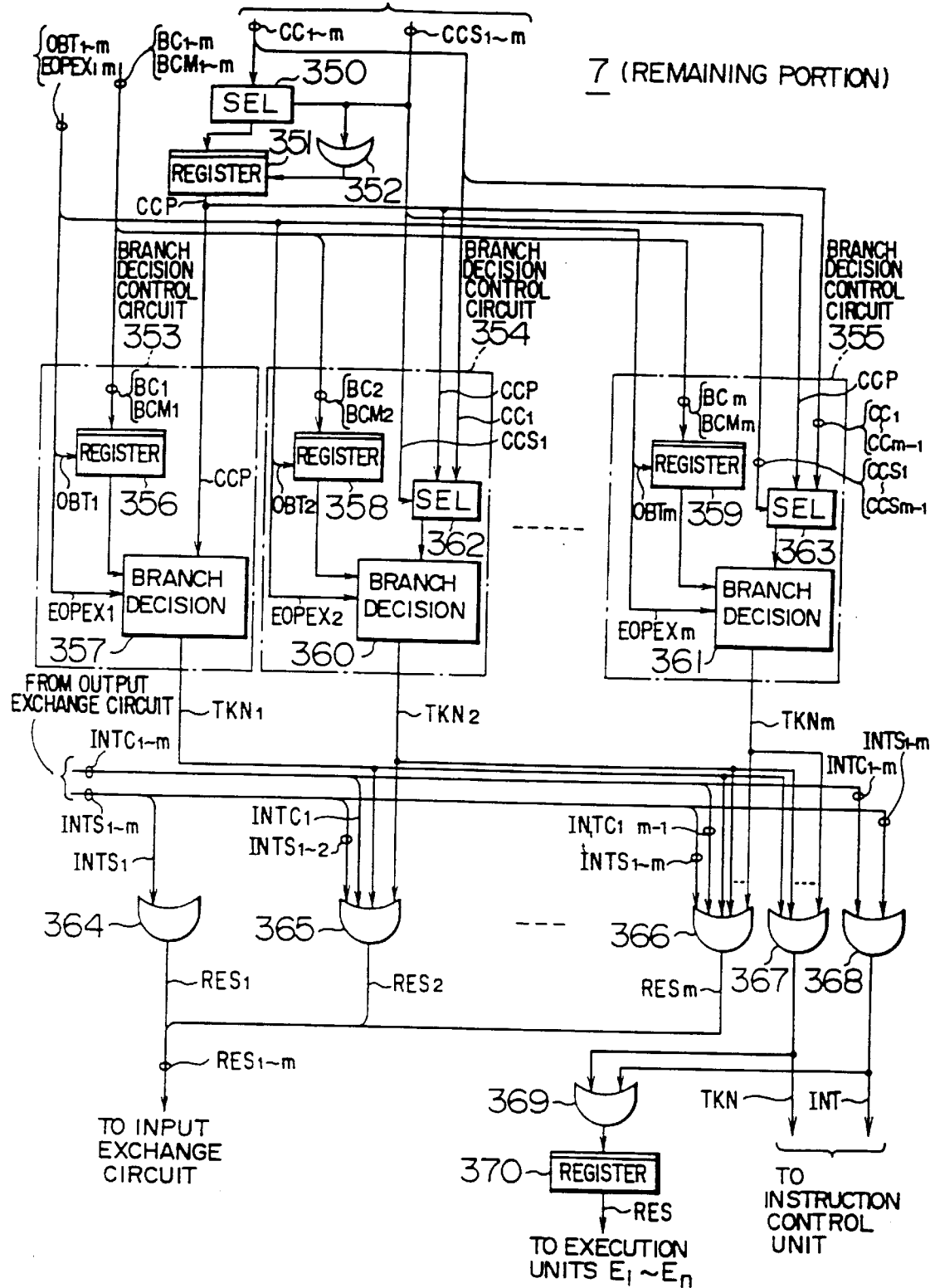
FIG. 3B shows a detailed diagram of a rest of the execution control unit 7 of FIG. 1.

The execution control unit 7 is explained with reference to FIGS. 3A and 3B. FIG. 3A shows a circuit for generating execution permit signal $EX_i$ (i=1–m), set-up end signal $LOBT_i$ (i=1–m), last execution start signal LBOP and number of set-up instruction LINO. Numerals 301–303 denote m NOR gates corresponding to the set-up ports i (i=1–m), which receive execution reserve conditions for the instructions set-up through the set-up ports, and inverted the output of logical ORs thereof. A condition FW1 which indicates that the operand for the first instruction of the set-up instructions to the port 1 has not yet arrived is supplied from an AND gate 317 to the NOR gates 301–303 as the execution reserve condition. A condition FW2 which indicates that the operand for the second instruction for the port 2 has not yet arrived is supplied from an AND gate 318 to the NOR gates 302 and 303. In general, a signal $FW_i$ for the i-th instruction is supplied to those of the NOR gates 301–303 which correspond to the ports i to m. Numerals 304–306 denote m flip-flops corresponding to the set-up ports i (i=1–m), which hold corresponding outputs of the NOR gates 301–303 each cycle and output them as the signals $EX_i$ (i=1–m). When the signal $FW_i$ is "1" for the i-th instruction, the execution permit signals $EX_j$ (j=i–m) for the i-th and subsequent instructions are "0" so that the execution of the i-th to m-th instructions is suppressed. In the present embodiment, the execution reserve condition is only the non-arrival of the operand. The passing of the execution may be prevented by supplying other reserve conditions to the NOR gates 301–303.

Numerals 307–309 denote m AND gates corresponding to the set-up ports i (i=1–m), which receive the execution end signals $EOP_i$ (i=1–m) sent from the output exchange circuit 9 and the execution permit signals $EX_i$ (i=1–m) sent from the flip-flops 304–306, and output logical ANDs thereof as the signals $EOPEX_i$ (i=1–m). The signal $EOPEX_i$ indicates that the execution of the i-th instruction has been permitted. Numeral 310 denotes an AND gate which receives the signals $EOPEX_i$ (i=1–m) and outputs a logical AND thereof as a signal ERDY. The signal ERDY indicates that all of the set-up instructions have been executed and all execution units $E_i$ (i=1–n) are vacant. In the present embodiment, the succeeding instructions are set-up only after the signal ERDY has been set to "1". Numerals 311–313 denote m AND gates corresponding to the set-up ports i (i=1–m), which receive the valid instruction signals $IRDY_i$ (i=1–m) sent from the instruction control unit 2 and the signal ERDY, and outputs a logical AND thereof. The outputs of the AND gates 311–313 indicate that the instructions have been set-up through the corresponding ports in that cycle. Numerals 314–316 denote m flip-flops corresponding to the set-up ports (i=1–m), which receive the set-up end conditions from the AND gates 311–313 at the data input terminals, and the signals $EX_i$ (i=1–m) from the flip-flops 304–306 at the clock terminals, and output set-up end signals $OBT_i$ (i=1–m). For the flip-flop of the flip-flops 314–316 which corresponds to the set-up port i, if there is a valid instruction for that port, the signal $OBT_i$ is "1" n the cycle in which the instruction has been set up, and when the execution actually starts, the signal $OBT_i$ is set to "0" in the next cycle. Numerals 337–339 denote m registers corresponding to the set-up ports i (i=1–m), which receive the signals $ENO_i$ (i=1–m) from the instruction control unit 2 and read the signals $ENO_i$ (i=1–m) when the outputs of the corresponding gates 311–313 are "1". The contents of those registers are sent to the input exchange circuit 8. Numerals 317–319 denote m AND gates corresponding to the set-up ports i (i=1–m), which receive the operand wait signals $ADVW_i$ (i=1–m) from the instruction control unit 2 and the signals $OBT_i$ (i=1–m) from the flip-flops 314–316, and output logical ANDs thereof as operand non-arrival condition sianals $FW_i$ (i=1–m). Numerals 320–322 denote m AND gates corresponding to the set-up ports i (i=1–m) which receive the execution permit signals from the NOR gates 301–303 and the set-up end signals $OBT_i$ (i=1–m) from the flip-flops 314–316, and output logical ANDs thereof as the execution start signals $BOP_i$ (i=1–m). Numerals 323–325 denote m AND gates corresponding to the set-up ports i (i=1–m) which detect that the instructions set-up through the corresponding ports are the conceptually last instructions of the simultaneously set-up instructions and the execution of those instructions has been started. The signal $BOP_i$ and the inverse of the signal $OBT_{i+1}$ are supplied to the AND gate corresponding to the set-up port 1. Only the signal $BOP_m$ is supplied to the gate 325. When the signal $BOP_i$ (i<m) is "1" and the signal $OBT_{i+1}$ corresponding to the next port i+1 is "0", the i-th instruction is the last instruction, because if it is assumed that the i-th instruction is not the last instruction, it would mean that the instructions have been set-up for the (i+1)th to m-th ports. If the instruction has been set up for the port i+1, the signal $OBT_{i+1}$ cannot be "0" when the signal $BOP_i$ is "1" because the start of execution of the (i+1)th instruction does not pass that of the i-th instruction. This is contradictory to the above. If it is assumed that the instruction has not been set up for the port i+1, it would mean that the instruction has not been set up for the i+2 to m ports. This cannot occur in the present embodiment because the instructions are set up for the continuous ports. This is because of an error in the assumption that the i-th instruction is not the last one. Accordingly, in this case, it may be said that the i-th instruction is the last one of the set-up instructions. When the signal $BOP_m$ is "1", it is clear that the m-th instruction is the last one. The output of the i-th one of the gates 323–325 is "1", and the outputs of other gates are "0". Numeral 326 denotes an OR gate which logically ORs the outputs of the gates 323–325 and outputs it as a signal LBOP. Numeral 327 denotes an encoder which receives the outputs of the AND gates 323–325, generates a port number corresponding to the gate which outputs the signal "1", and outputs it as a signal LINO.

FIG. 3B shows a circuit of the execution control unit for generating the conditional branch decision signal TKN, interrupt detect signal INT and execution cancel signal $RES_i$ (i=1–m). Numeral 350 denotes a condition code selector which receives condition codes $CC_i$ (i=1–m) of instructions corresponding to the set-up ports and set signals $CCS_i$ (i=1–m) thereof from the output exchange circuit, selects a condition code for that one of the "1" $CCS_i$ (i=1–m) signals which has the largest number, and sends it to a register 351. Numeral 352 denotes an OR gate which receives the signals $CCS_i$ (i=1–m) and sends a logical OR thereof to a clock terminal of the register 351, which is a condition code register and sets the condition code supplied from the selector 350 when the clock signal from the OR gate 352 is "1". The condition code CCP from the register 351 indicates that all of the simultaneously set-up instructions have been executed. Numeral 353 denotes a branch decision control circuit when a conditional branch instruction is set-up to the set-up port 1. Numerals 354 and 355 denote branch decision control circuits corresponding to the set-up ports i (i=2–m). Numerals 356, 358 and 359 denote m registers corresponding to the set-up ports i (i=1–m), which set those of the conditional branch instruction signals $BC_i$ (i=1–m) and mask signals $BCM_i$ (i=1–m) supplied from the instruction control unit which relate to the corresponding ports. The signal $OBT_i$ (i=1–m) generated in the execution control unit is supplied to each register as a clock signal. Numerals 362 and 363 denote condition code selectors, which output the latest condition codes for the conditional branch instruction when the conditional branch instruction is set us from the corresponding set-up port. The signals CCP, CC1 and CCS1 are supplied to the selector 362. When the signal CCS1 is "1", it means that the first instruction sets the latest condition code, and the selector 362 outputs the signal CC1. If the signal CCS1 is "0", it outputs the signal CCP. In general, the signals CCP, CC1, . . . , $CC_{i-1}$, CCS1, . . . , $CCS_{i-1}$ are supplied to the selector 362, 363 which corresponds to the set-up port i (i>1). If all of the signals CCS1, . . . , $CCS_{i-1}$ are "0", that is, if there is no instruction in the simultaneously set-up instructions which sets the condition code prior to the conditional branch instruction, the selector outputs the signal CCP. If at least one of the signals CCS1, . . . , $CCS_{i-1}$ is "1", the selector outputs the condition code which corresponds to the largest port number. It is thus seen that the selectors 362 and 363 output the latest condition codes for the conditional branch instruction when the conditional branch instruction is set up from the corresponding set-up port. Numerals 357, 360 and 361 denote branch decision circuits. The circuit 357 receives the signal CCP from the condition code register 351, the signals BC1 and BCM1 from the register 356, and the signal EOPEX1 generated in the execution control unit. The signal EOPEX1 indicates the cycle in which the first instruction has been executed. if the signal BC1 is "1", that is, if the instruction is a conditional branch instruction, the presence or absence of branch is determined based on the mask value BCM1 and the latest condition code CCP, and the result is outputted as a signal TKN1. Similarly, the circuits 360 and 361 receive the latest condition codes thereto from the selectors 362 and 363, the signals $BC_i$ (i=2–m) and $BCM_i$ (i=2–m) from the registers 358 and 359, and the signals $EOPEX_i$ (i=2–m) generated in the execution control unit. They determine the branch conditions and output the results thereof as signals $TKN_i$ (i=2–m), as the circuit 353 does. Numerals 354–366 denote m OR gates corresponding to the set-up ports i (i=1–m), which output execution cancel signals $RES_i$ (i=1–m) for the corresponding instructions. The signal TKN1 and the signal INTC1 from the output exchange circuit are supplied to the OR gates 365 and 366. In general, the signals $TKN_i$ (i=2–m) and $INTC_i$ (i=2–m) are supplied to those of the gates 365 and 366 which correspond to the ports i+1 to m. The signal INTS1 from the outout exchange circuit is supplied to the OR gates 364–366. The signal $INTS_i$ (i=2–m) is supplied to those of the gates 365 and 366 which correspond to the ports i to m. It is thus seen that when a branch succeeds or a completion type interruption occurs for the i-th instruction, the cancellation signals $RES_{i+1}, \ldots, RES_m$ are sent to the execution units which execute the (i+1)th and subsequent instructions, and when a suppression type interruption occurs for the i-th instruction, the cancellation signals $RES_{i+1}, \ldots, RES_m$ are sent to the execution units which execute the i-th and subsequent instructions. Numerals 367 and 368 denote OR gates which send logical ORs of the branch success signals $TKN_i$ (i=1–m) and the interrupt detect signals $INTC_i$ (i=1–m) and $INTS_i$ (i=1–m) to the instruction control unit as signals TKN and INT. Numeral 369 denotes an OR gate which sends a logical OR of the signals INT and TKN to a flip-flop 370, which holds the output of the OR gate 369 for one cycle and sends the output signal RES to the execution units $E_i$ (i=1–n). The signal RES suppresses the execution of the instructions set us in the immediately suceeding cycle.

Figure 4:
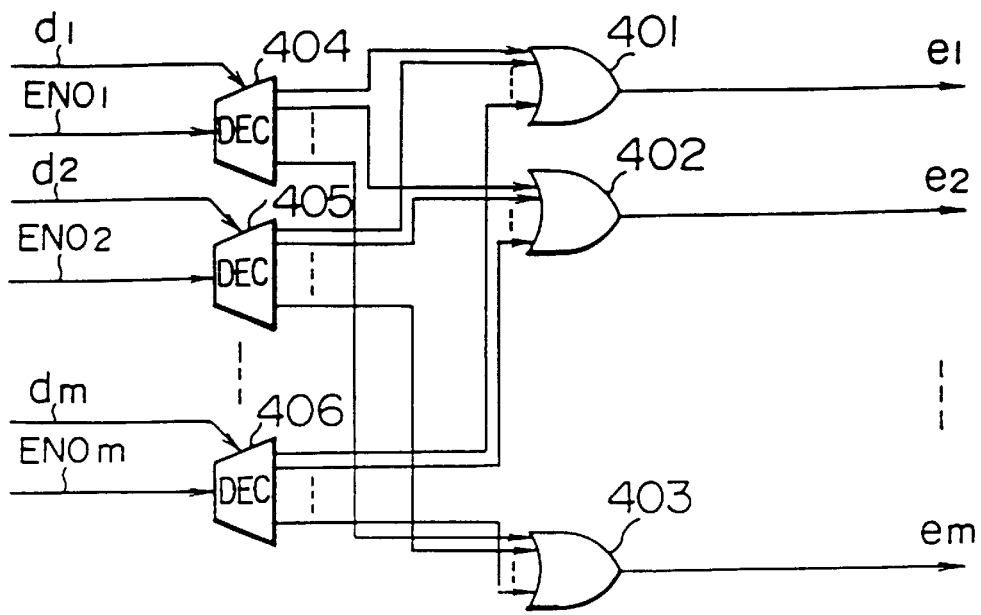
FIG. 4 shows a general diagram of an input exchange circuit 8 of FIG. 1.

FIG. 4 shows the input exchange circuit 8. Numerals 401–403 denote n OR gates corresponding to the execution units $E_i$ (i=1–n), which output the data to be set up in the execution units. Numerals 404–406 denote m decoders corresponding to the set-up ports i (i=1–m) which receive input data $d_i$ (i=1–m) and execution unit numbers $ENO_i$ (i=1–m) and send n decode signals corresponding to the execution units $E_i$ (i=1–n) to the OR gates 401–403. When the input data is "1", each decoder sets the decode signal designated by the execution unit number to "1". The input data $d_i$ (i=1–m) may include $INST_i$, $RD_i$, $MA_i$, $MD_i$, $RWA_i$, $OBT_i$, $EX_i$ and $RES_i$ (i=1–m), and the exchange circuit of FIG. 4 is provided for each of the input data.

Figure 5:
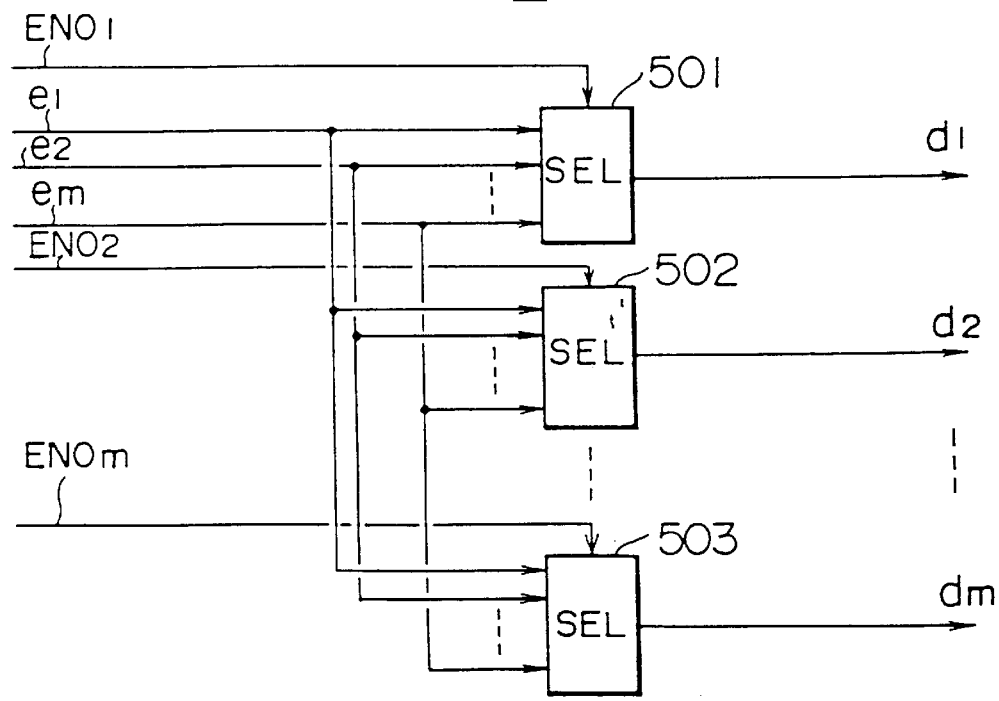
FIG. 5 shows a general diagram of an output exchange circuit 9 of FIG. 1.

FIG. 5 shows the output exchange circuit 9. Numerals 501–503 denote m selectors corresponding to the set-up ports i (i=1–m). Each of the selectors 501–503 receives the execution unit number $ENO_i$ (i=1–m) from the execution control unit 7 and the output data $e_i$ (i=1–n) from the execution units, and outputs that input data $e_i$ (i=1–n) which is designated by the corresponding execution unit number, as the signal $d_i$ (i=1–m). The output data may include the signals $ED_i$ (i=1–m), $RWA_i$ (i=1–m) and $STA_i$ (i=1–m).

Figure 10A:
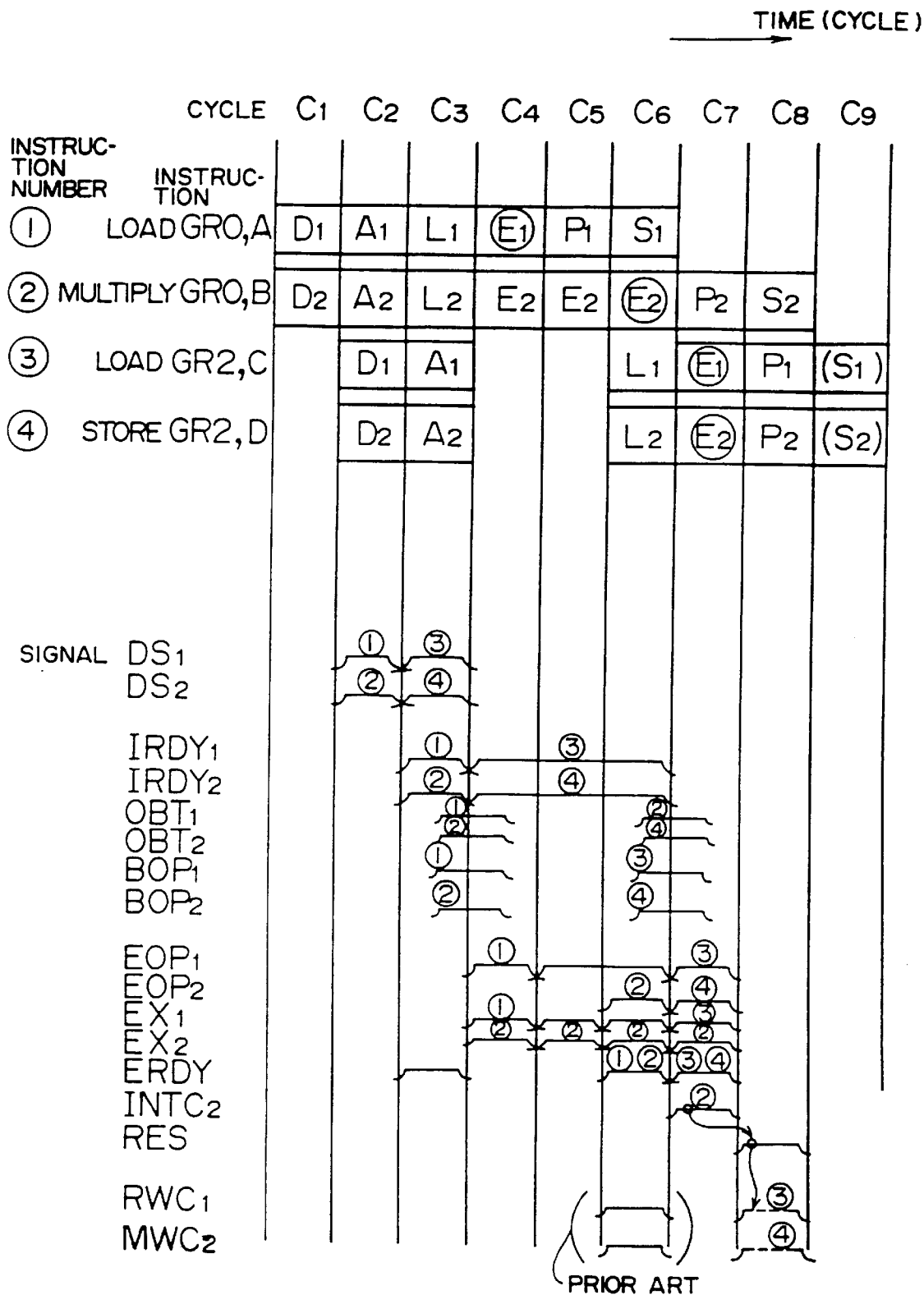

The operation of the computer of the present embodiment is now explained for a typical instruction sequence. FIG. 10A shows an operation time chart for a four-instruction sequence, Load, Multiply, Load and Store. In the present embodiment, one instruction process comprises six stages excluding instruction fetching. In a stage D, an instruction is decoded and an operand address is generated. In a stage A, the decoded information is stored into the instruction queue and a memory operand or a target instruction of a branch instruction is read. In a stage L, the instruction is set up. In a stage E, the instruction is executed. In a stage P, the execution result is checked or a conditional branch is determined, and a write command for the execution result is issued. In a stage S, the execution result is written into a register or memory. The stage S may be omitted depending on the instruction. For a simplest instruction, each stage comprises one cycle, but depending on the instruction, certain, stases comprise a plurality of cycles. In FIG. 10A, an abscissa represents axis a time measured by a machine cycle and an ordinate axis indicates the instruction sequence and major signals or major processes. The four instructions are designated by the instruction numbers 1–4.

In FIG. 10A, the instructions 1 and 2 are simultaneously set up. As they are executed, a completion type interruption occurs in the instruction 2. Thus, the execution of the succeeding instructions 3 and 4 are cancelled. The instructions 1 and 2 are simultaneously decoded in a cycle C1. In a cycle C2, the instruction decode end signals DS1 and DS2 are "1". In a cycle C3, the valid instruction signal IRDY1 and IRDY2 are "1". If none of the execution units is vacant, the signal ERDY is "1". Accordingly, the instructions are set up in this cycle and the signals OBT1 and OBT2 are set to "1". Since there is no execution reserve condition, the execution is immediately started and the signals BOP1 and BOP2 are set to "1". In a cycle C4, the execution permit signals EX1 and EX2 are set to "1". Since the stage E for the instruction 1 ends in one cycle, the execution end sianal EOP1 is set to "1" in the cycle C4. On the other hand, since the instruction 2 requires three cycles for the stage E, the signal EOP2 is set to "1" in a cycle C6. Accordingly, it is in the cycle C6 that the signal ERDY is next set to "1". In the present example, since the completion type interrupt condition is detected at the end of the stage E for the instruction 2, the signal INTC2 is set to "1" in the stage P and the signal RES is set to "1" in the stage S. On the other hand, the instructions 3 and 4 start in the stage D, one cycle delayed with respect to the instructions 1 and 2, and the signals IRDY1 and IRDY2 are set to "1" in the cycle C4. However, since the execution of the preceding instruction group has not yet been completed and the signal ERDY is "0", the set-up of the instructions is reserved. In the cycle C6, the signal ERDY is set to "1" and the instructions 3 and 4 are set-up. The instructions 3 and 4 are then executed through the stages E and P, and enter into the stage S in a cycle C9. However, since the interruption has occurred in the preceding instruction 2 and the signal RES has been set to "1" in the cycle C8, the write commands RWC1 and MWC2 for the results of the execution of the instructions 3 and 4 in the cycle C8 are inhibited. Since the instructions 3 and 4 are set up after the instructions 1 and 2 have been executed, the issuance of the write commands to the instructions 3 and 4 is done after the stage P in which the interruption in the instructions 1 and 2 is detected. As a result, the inhibition of the write commands RWC1 and MWC2 is attained. In the conventional computer, the instructions 3 and 4 are set up and executed without waiting for the completion of the instructions 1 and 2 and hence the result has been written when the interruption of the instruction 2 is detected. Accordingly, It is necessary to recover previously buffered data when a register is used, and it is difficult to comply with the specification of the M Series architecture when a memory is used.

Figure 10B:
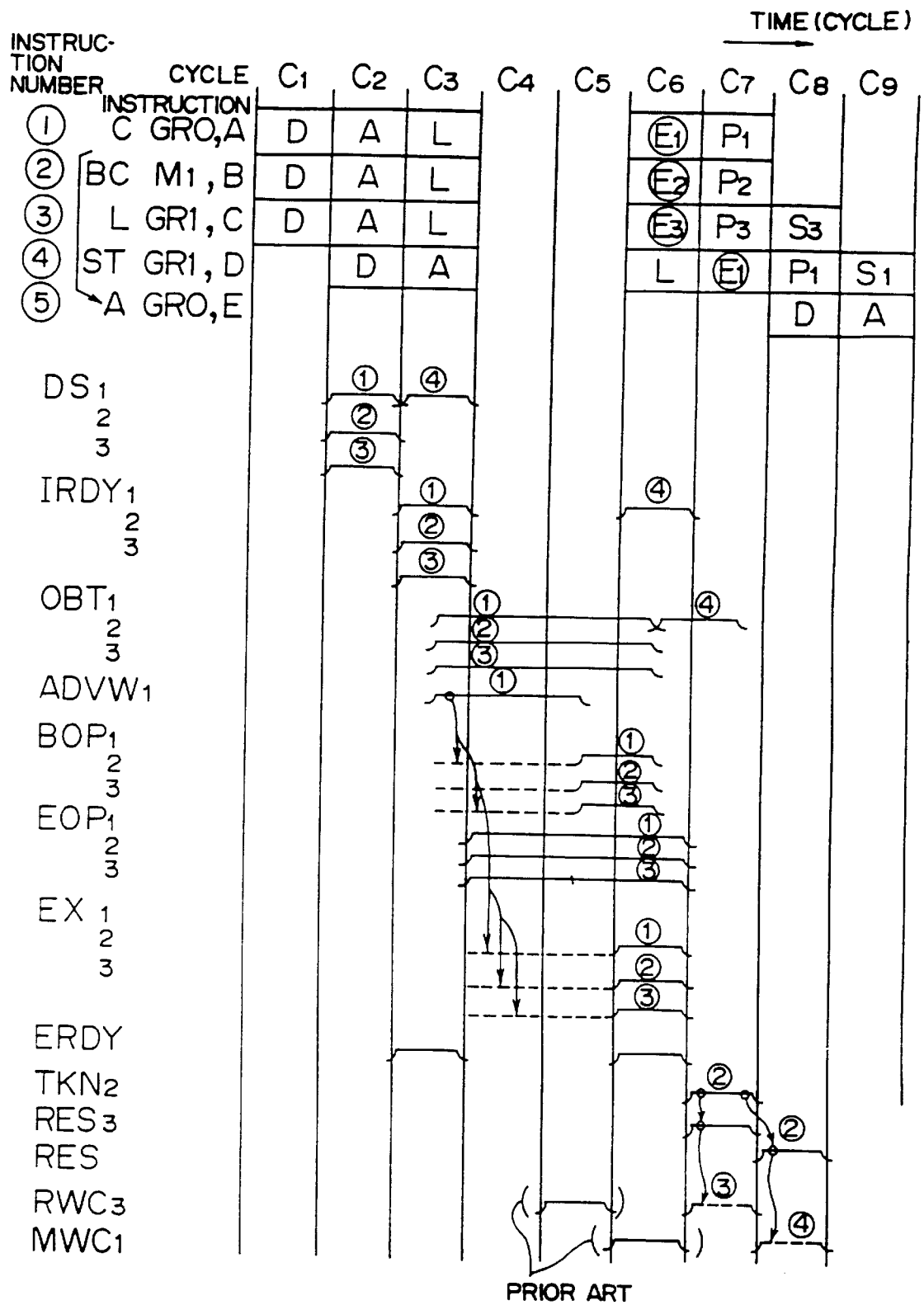

In FIG. 10B, a branch-on-condition instruction of a four instruction sequence, Compare, Branch on Condition, Load and Store on a main memory succeed the branch, the pre-executed instructions Load and Store are cancelled, and a target instruction Add is executed. In the present example, the memory operand readout of the instruction 1 is delayed two cycles. The instructions 1, 2 and 3 are decoded in a cycle C1, and the signals DS1, DS2 and DS3 are set to "1" in a cycle C2. In a cycle C3, the signals IRDY1, IRDY2 and IRDY3 are set to "1". If all execution units are vacant and the signal ERDY is "1", the instructions are set up and the signals OBT1, OBT2 and OBT3 are set to "1". For two cycles from C3 to C5, the signal ADVW1 is "1" to indicate that the memory operand for the instruction 1 has not yet arrived. In response thereto, the execution permit signals EX1, EX2 and EX3 and the execution start signals BOP1, BOP2 and BOP3 for the succeeding instructions are inhibited for the two-cycle period. In a cycle C6, the execution of the instructions 1, 2 and 3 starts and the branch success signal TKN2 for the branch-on-condition instruction is set to "1" in the stage P (C7). In response thereto, the signal RES3 is set to "1" in the cycle C7 and the signal RES is set to "1" in a cycle C8, and the register write command RWC3 of the instruction 3 and the memory write command MWC1 to the memory 1 by the instruction 3 are inhibited. The inhibition of the write command of the result by the instruction 3 is attained because the execution thereof is started after the execution of the instructions 1 and 2 has been started and the issuance of the write command of the instruction 3 is done after the stage P in which the branch of the instruction 2 is determined since the number of cycles of the execution stage of the instruction 3 is not shorter than that of the instruction 2. The decoding of the target instruction starts from the cycle C8. In the conventional computer, since the execution of the instruction 3 is not necessarily reserved based on the execution reserve condition of the instruction 1, the result has usually been written when the branch success of the instruction 2 is detected. Accordingly, it is necessary to recover the previously buffered data into the register, or if the instruction 3 is a Store instruction, it is difficult to comply with the specification of the M Series architecture. The inhibition of the write command to the memory for the instruction 4 is attained by the same reason as that for FIG. 10A.

In accordance with the present invention, in an information processing apparatus based on an architecture in which instructions are executed one by one as viewed from a program, the assurance of order in case of interruption or prediction failure by a branch instruction is very easy to attain when high speed operation by parallel execution is to be attained. If the present system is not used, it is necessary to always buffer the initial content of the register for the instruction to store the result into the register and recover the register in the above case. As a result, a control circuit is necessary and a process time is long. For the instruction to write the result into the main memory, it is impossible with the currently available technique to comply with the order specification.

We claim:

1. An information processing system comprising:
   a memory storing data and a series of instructions;
   an input and output device connected to said memory; and
   an execution device executing a plurality of instructions read from said memory in sequential order, said execution device comprising:
      a plurality of execution units executing processing required by said instructions;
      an instruction fetch circuit connected to said memory, fetching selected ones of said series of instructions from said memory;
      an instruction decoding circuit connected to said instruction fetch circuit decoding the instructions fetched by said instruction fetch circuits;
      an address adder responsive to an output from said instruction decoding circuit, calculating an address necessary for execution of instructions by said execution units;
      said decoded instructions output from said instruction decoding circuit being input to said plurality of execution units in groups, such that a group of decoded instructions to be executed next are supplied simultaneously to different ones of said plurality of execution units in response to the completion of execution of a preceding group of decoded instructions supplied to said plurality of execution units; and
      said plurality of execution units delaying starts of execution of both one processing required by one of the group of decoded instructions and one or more other processings required by one or more other decoded instructions succeeding the one decoded instruction within the group, when the one processing needs to be delayed.

2. The information processing system according to claim 1, wherein said plurality of execution units delays start of both the one processing and the one or more other processing when a memory operand required by the one processing is not yet available for use.

3. A method for processing a plurality of sequentially-ordered instructions comprising the steps of:
   storing data and a series of instructions in a memory;
   fetching selected ones of said series of instructions from said memory;
   decoding the fetched instructions;
   calculating from the decoded instruction addresses of a plurality of execution units necessary for execution of said instructions;
   executing decoded instructions by the plurality of execution units in such a manner that a group of decoded instructions to be executed next are simultaneously forwarded to different ones of said plurality of execution units, each of which is capable of executing processing required by one of the instructions of the group of decoded instructions, in response to completion of execution, by different ones of said plurality of execution units, of the processing of instructions of a preceding group of decoded instructions previously executed; and
   delaying execution of processing by each of the plurality of execution units for which the group of decoded instructions has been forwarded so that starts of execution of both one processing required by one of the group of decoded instructions and one or more other processings required by one or more other decoded instructions succeeding the one decoded instruction within the group are delayed, when said one processing needs to be delayed.

4. The method according to claim 3, further comprising a step of delaying a start of both the one processing and the one or more other processings when a memory operand by the one processing is not yet available for use.

5. An information processing system for parallel execution of sequentially-ordered instructions, comprising:
   a plurality of execution units, each execution unit executing processing required by an instruction;
   a memory storing a series of instructions;
   an instruction fetch circuit coupled to said memory, fetching selected ones of said series instructions from said memory;
   an instruction decoding circuit coupled to said instruction fetch circuit decoding the instructions fetched by said instruction fetch circuit;

said decoded instructions being output from said instruction decoding circuit to said plurality of execution units in groups, such that a group of decoded instructions to be executed next is supplied simultaneously to different ones of said plurality of execution units, each of which is capable of executing processing required by one of the instructions of the group of decoded instructions, in response to completion of execution, by different ones of said plurality of execution units, of the processing of instructions of a preceding group of decoded instructions applied to said plurality of execution units; and said plurality of execution units delaying starts of execution of processing by each of the plurality of execution units for which the group of decoded instructions has been applied, so that starts of execution of both one processing required by one of the group of decoded instructions and one or more other processings required by one or more other decoded instructions succeeding to the one decoded instruction within the group are delayed, when the one processing needs to be delayed.

6. An information processing method for parallel execution of a plurality of sequentially-ordered instructions, comprising the steps of:

storing a series of said plurality of instructions in a memory;

fetching selected ones of said plurality of instructions from said memory;

decoding the fetched instructions;

executing decoded instructions with a plurality of execution units in such a manner that a group of decoded instructions to be executed next are simultaneously forwarded to different ones of said plurality of execution units, each of which is capable of executing processing required by one of the instructions of the group of decoded instructions, in response to completion of execution, by different ones of said plurality of execution units, of the processing of instructions of a preceding group of decoded instructions previously executed; and delaying execution of processing by each of the plurality of execution units for which the group of decoded instructions have been forwarded so that starts of execution of both one processing required by one of the group of decoded instructions and one or more other processings required by one or more other decoded instructions succeeding the one decoded instruction within the group are delayed, when said one processing needs to be delayed.

7. An information processing system comprising:

a plurality of execution units executing processing required by respective instructions;

a memory storing sequenced instructions;

an instruction fetch circuit coupled to said memory and fetching selected ones of said sequenced selected ones of said instructions from said memory;

a plurality of decode circuits coupled to said instruction fetch circuit and decoding the instructions fetched from said instruction fetch circuit;

registers holding data for execution; and a providing circuit coupled to said plurality of decode circuits and said plurality of execution units, and, in response to the end of execution of a plurality of decode instructions, previously input to said plurality of execution units, by said plurality of execution units, providing said plurality of execution units with data obtained based on a plurality of instructions to be executed subsequent to said plurality of instructions previously input to said plurality of execution units and the content of said registers, and said plurality of instructions to be executed subsequent to said plurality of instructions previously input to said plurality of execution units.

8. An information processing system according to claim 7, further comprising, a first detection circuit detecting whether said plurality of execution units include executable execution units by means of which processing required by predetermined decoded instructions which are to be executed subsequent to said plurality of instruction previously input to said execution units are executable; and a second detection circuit detecting whether the execution time of processing required by each of said predetermined decoded instructions is larger than the execution time of processing required by any one of succeeding instructions among said predetermined decoded instructions; and a selection circuit selecting and inputting a set of succeeding instructions, to be executed subsequent to said plurality of decoded instructions, to said execution units, in accordance with detection results of said first detection circuit and said second detection circuit.

9. An information processing system comprising:

a plurality of execution units, executing processings required by instructions, respectively;

a memory, storing sequenced instructions;

an instruction fetch circuit, coupled to said memory and fetching selected ones of said instructions from said memory;

a plurality of decode circuits coupled to said instruction fetch circuit and decoding the instructions fetched from said instruction fetch circuit;

registers holding data for execution; and a providing circuit coupled to said plurality of decode circuits and said plurality of execution units, and, in response to the end of execution of a plurality of decoded instructions, previously input to said plurality of execution units, by said plurality of execution units, providing said plurality of execution units with a plurality of instructions to be executed subsequent to said plurality of instructions previously input to said plurality of execution units.

10. An information processing system comprising:

a plurality of execution units each executing processing requested by instructions a main memory storing ordered instructions;

an instruction fetch circuit coupled to said main memory and fetching selected ones of said instructions from said main memory;

a plurality of decode circuits coupled to said instruction fetch circuit and decoding the instructions fetched by said instruction fetch circuit;

registers holding data for executions; and a providing circuit coupled to said plurality of decode circuits and said plurality of execution units, and, in response to the end of full execution of a plurality of decode instructions, previously input to said plurality of execution units, by said plurality of execution units, providing said plurality of execution units with a plurality of ordered and decoded instructions which are to be executed subsequent to said plurality of decoded instructions previously input to said execution units and information from said main memory obtained based on said plurality of ordered and decoded instructions and said data in said registers.

11. An information processing system comprising:

a plurality of execution units each executing processing requested by instructions a main memory storing ordered instructions;

an instruction fetch circuit coupled to said main memory and fetching selected ones of said instructions from said main memory;

a plurality of decode circuits coupled to said instruction fetch circuit and decoding the instructions fetched by said instruction fetch circuit;

registers holding data for executions; and a providing circuit coupled to said plurality of decode circuits and said plurality of execution units, and, upon late arrival of a plurality of ordered and decoded instructions previously input to said plurality of execution units due to delay of memory operands from said main memory, delaying execution of said plurality of ordered and decoded instructions until arrival of said memory operands, and in response to the end of execution of said plurality of decoded instructions, previously input to said plurality of execution units, by said plurality of execution units, providing said plurality of execution units with a plurality of ordered and decoded instructions which are to be executed subsequent to said plurality of ordered and decoded instructions previously input to said execution units and data from said registers designated by said plurality of ordered and decoded instructions.

* * * * *

UNITED STATES PATENT AND TRADEMARK OFFICE
CERTIFICATE OF CORRECTION

PATENT NO. : 5,922,068
DATED : July 13, 1999
INVENTOR(S) : Yooichi SHINTANI, et al.

It is certified that error appears in the above-indentified patent and that said Letters Patent is hereby corrected as shown below:   Title page, item [57], ABSTRACT, line 3, change "comprises" to --comprising--.

Column 1, line 18, after "in" insert --the--.

Column 1, line 19, after "execution" insert --of--.

Column 1, line 50, change "she execution" to --the execution--.

Column 1, line 51, delete "and".

Column 7, line 49, insert --a-- before "typical".

Column 12, line 28, change "an inverted" to --a negative--.

Column 12, line 41, delete "an".

Column 13, line 39, delete "that".

UNITED STATES PATENT AND TRADEMARK OFFICE
CERTIFICATE OF CORRECTION

PATENT NO. : 5,922,068
DATED : July 13, 1999
INVENTOR(S) : Yooichi SHINTANI, et al.

It is certified that error appears in the above-indentified patent and that said Letters Patent is hereby corrected as shown below:

Column 14, line 40, change "inverted" to --invert--.

Column 18, line 6, change "represents axis" to --axis represents--.

Signed and Sealed this

Fourteenth Day of November, 2000

Attest:

*Attesting Officer*

Q. TODD DICKINSON
*Director of Patents and Trademarks*